United States Patent
Smith et al.

(10) Patent No.: US 11,144,911 B2
(45) Date of Patent: Oct. 12, 2021

(54) TECHNOLOGIES FOR DEVICE COMMISSIONING

(71) Applicant: Intel Corporation, Santa Clara, CA (US)

(72) Inventors: Ned M. Smith, Beaverton, OR (US); David W. Grawrock, Aloha, OR (US); Geoffrey H. Cooper, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1059 days.

(21) Appl. No.: 15/187,631

(22) Filed: Jun. 20, 2016

(65) Prior Publication Data
US 2017/0364908 A1 Dec. 21, 2017

(51) Int. Cl.
*G06Q 20/36* (2012.01)
*G06Q 20/02* (2012.01)
*G06Q 20/20* (2012.01)
*G06Q 20/38* (2012.01)
*G06Q 20/40* (2012.01)

(52) U.S. Cl.
CPC ......... *G06Q 20/367* (2013.01); *G06Q 20/023* (2013.01); *G06Q 20/202* (2013.01); *G06Q 20/203* (2013.01); *G06Q 20/3827* (2013.01); *G06Q 20/3829* (2013.01); *G06Q 20/405* (2013.01); *G06Q 2220/00* (2013.01)

(58) Field of Classification Search
CPC .............. G06Q 20/023; G06Q 20/202; G06Q 20/0655; G06Q 20/203; G06Q 20/3827; G06Q 20/3829; G06Q 20/405; G06Q 20/367

USPC .......................................................... 705/65
See application file for complete search history.

(56) References Cited

U.S. PATENT DOCUMENTS

| | | | |
|---|---|---|---|
| 2013/0007877 | A1 | 1/2013 | Little et al. |
| 2015/0134954 | A1 | 5/2015 | Walley et al. |
| 2015/0222621 | A1 | 8/2015 | Baum et al. |
| 2016/0098723 | A1* | 4/2016 | Feeney |
| 2016/0164884 | A1* | 6/2016 | Sriram et al. |
| 2016/0205106 | A1* | 7/2016 | Yacoub et al. |

(Continued)

FOREIGN PATENT DOCUMENTS

| CN | 109155730 A | 1/2019 |
|---|---|---|
| DE | 112017002070 T5 | 1/2019 |

OTHER PUBLICATIONS

"IEEE 802.1X," Wikipedia, <https://en.wikipedia.org/wiki/IEEE_802.1X>, retrieved on Oct. 6, 2016, 7 pages.

(Continued)

*Primary Examiner* — James D Nigh
*Assistant Examiner* — Yin Y Choi
(74) *Attorney, Agent, or Firm* — Jaffery Watson Mendonsa & Hamilton LLP

(57) ABSTRACT

Technologies for device commissioning include a rendezvous server to receive, from a buyer device, a request to transfer ownership of a compute device to the buyer device. The rendezvous server verifies the provenance of the compute device based on a block chain and establishes a secure session with the compute device in response to verification of the provenance. The block chain identifies each transaction associated with ownership of the compute device.

23 Claims, 9 Drawing Sheets

(56) References Cited

U.S. PATENT DOCUMENTS

| | | | |
|---|---|---|---|
| 2016/0275461 | A1* | 9/2016 | Sprague et al. |
| 2016/0292680 | A1* | 10/2016 | Wilson et al. |
| 2016/0300234 | A1* | 10/2016 | Moss-Pultz et al. |
| 2016/0350728 | A1* | 12/2016 | Melika et al. |
| 2017/0046664 | A1* | 2/2017 | Haldenby et al. |
| 2017/0046806 | A1* | 2/2017 | Haldenby et al. |
| 2017/0237554 | A1* | 8/2017 | Jacobs et al. |
| 2017/0302663 | A1* | 10/2017 | Nainar et al. |
| 2017/0310775 | A1* | 10/2017 | Tatourian et al. |
| 2019/0149558 | A1* | 5/2019 | Phan |

OTHER PUBLICATIONS

"Bitcoin," Wikipedia, <https://en.wikipedia.org/wiki/Bitcoin>, retrieved on Oct. 6, 2016, 34 pages.

"DNS-based Authentication of Named Entities,", Wikipedia, <https://en.wikipedia.org/wiki/DNS-based_Authentication_of_Named_Entities>, retrieved on Oct. 6, 2016, 4 pages.

"IPsec," Wikipedia, <https://en.wikipedia.org/wiki/IPsec>, retrieved on Oct. 6, 2016, 10 pages.

"Transport Layer Security," Wikipedia, <https://en.wikipedia.org/wiki/Transport_Layer_Security>, retrieved on Oct. 5, 2016, 27 pages.

"Datagram Transport Layer Security," Wikipedia, <https://en.wikipedia.org/wiki/Datagram_Transport_Layer_Security>, retrieved on Oct. 6, 2016, 4 pages.

International search report for PCT application No. PCT/US2017/033562, dated Nov. 17, 2017 (5 pages).

Written opinion for PCT application No. PCT/US2017/033562, dated Nov. 17, 2017 (6 pages).

Oscar Garcia-Morchon et al. 'Security Considerations in the IP-based Internet of Things', Sep. 11, 2013, pp. 1-45, accessed Jan. 9, 2018 (https://tools.ietf.org/pdf/draft-garcia-core-security-06.pdf).

Ned Smith, 'OIC Security Model and Vision', In: Embedded Linux Conference, Mar. 22, 2015, accessed Jan. 9, 2018 (http://elinux.org/images/2/24/The_Open_Interconnect_Consortium_%28OIC%29_Security_Model_and_Vision.pdf).

* cited by examiner

TECHNOLOGIES FOR DEVICE COMMISSIONING

BACKGROUND

An onsite security professional is typically required to securely provision or commission a device such as an Internet of Things (IoT) device. However, the automated deployment of millions of smart devices from manufacturers to end customers, such as industrial sites, may make such an onsite professional an unreasonable expectation. Some techniques have been employed in an attempt to remove some of the barriers. For example, DNS-Based Authentication of Named Entities (DANE) has been proposed by the Internet Engineering Task Force (IETF) to identify the IP address and port number of a commissioning device and an uncommissioned device (e.g., a device to be commissioned). However, DANE fails to address whether the transfer of device ownership of the uncommissioned device is intended.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
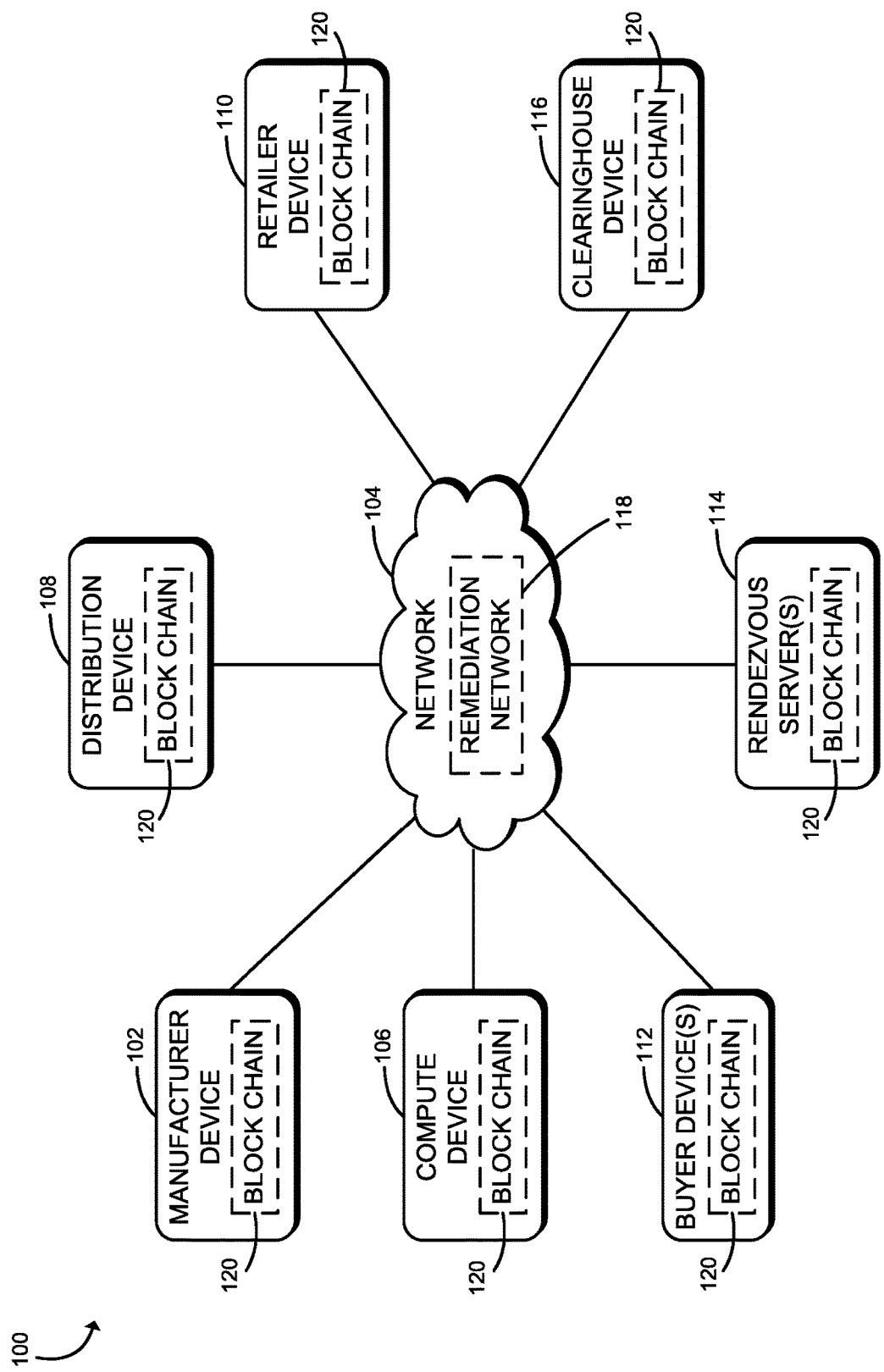
FIG. 1 is a simplified block diagram of at least one embodiment of a system for device commissioning.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for device commissioning is shown. It should be appreciated that the system 100 includes a broker service (e.g., the rendezvous server 114) that facilitates the pairing of uncommissioned devices (e.g., the compute device 106) with commissioning services where there is provenance of the purchase transactions and a record maintained to reliably establish the device's ownership. In the illustrative embodiment, the system 100 is able to scale to accommodate the requirements of industrial and/or consumer device owners. As described below, the rendezvous server 114 may operate as a cloud service that is trusted by the uncommissioned devices to perform a rendezvous service. In particular, the rendezvous service may associated devices that have been purchased through a retailer, wholesaler, or other distributed with their rightful owners, and a record of the purchase transaction(s) may be maintained (e.g., centrally) through the use of a block chain 120. It should be appreciated that the block chain 120 may be implemented as a Bitcoin block chain or an alternative block chain depending on the particular embodiment (e.g., using another cryptocurrency that involves block chains). It should be further appreciated that, in a complex distribution chain involving many potential points of distribution or where the supply chain and distribution chain overlap, the techniques described herein establish a chain-of-custody that is open to public inspection and investigation should suspicion of impropriety exist (i.e., posterity of the record by virtue of the block chain 120).

In some embodiments, when a purchase order is filled, a record of the devices involved is added to the block chain 120 in the appropriate order (e.g. chronologically). There may be multiple purchase order exchanges between the time the compute device 106 is manufactured and the time the device 106 arrives at a retailer and is sold to the end buyer. In the illustrative embodiment, each of the exchanges results in an entry in the block chain 120 such that the end buyer entitled to ownership rights in the device 106 may rely on a publicly inspectable record in the form of the block chain 120 to prove ownership rights. It should be appreciated that, when an uncommissioned device makes an "appearance" on the network, it may rely on a DANE service to identify the device owner's commissioning tool to be used to begin automated commissioning.

As shown in FIG. 1, the system 100 includes a manufacturer device 102, a network 104, a compute device 106, a distribution device 108, a retailer device 110, one or more buyer devices 112, one or more rendezvous servers 114, and a clearinghouse server 116. Although only one manufacturer device 102, one network 104, one compute device 106, one distribution device 108, one retailer device 110, and one clearinghouse device 116 are illustratively shown in FIG. 1, the system 100 may include any number of manufacturer devices 102, networks 104, compute devices 106, distribution devices 108, retailer devices 110, and/or clearinghouse devices 116 in other embodiments.

Each of the manufacturer device 102, the compute device 106, the distribution device 108, the retailer device 110, the buyer device(s) 112, the rendezvous server(s) 114, and/or the clearinghouse device 116 may be embodied as any type of computing device capable of performing the functions described herein. For example, in some embodiments, each of the manufacturer device 102, the compute device 106, the distribution device 108, the retailer device 110, the buyer device(s) 112, the rendezvous server(s) 114, and/or the clearinghouse device 116 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

For example, in some embodiments, the manufacturer device 102 is a device of the manufacturer of one or more compute devices 106, the distribution device 108 is a device of a distributor of the compute devices 106, the retailer device 110 is a device of the retailer responsible for selling the compute devices 106 to consumers, the buyer device 112 is a device of the consumer purchasing the compute device 106, the rendezvous server 114 performs the rendezvous service, and the clearinghouse device 116 is a device associated with constructing a hash chain of transactions (e.g., the block chain 120). In some embodiments, the clearinghouse device 116 stores and is responsible for updating the block chain 120, whereas in other embodiments, the block chain 120 may be distributed across multiple devices of the system 100. In such embodiments, it should be appreciated that the devices of the system 100 may periodically synchronize the block chain 120.

Figure 2:
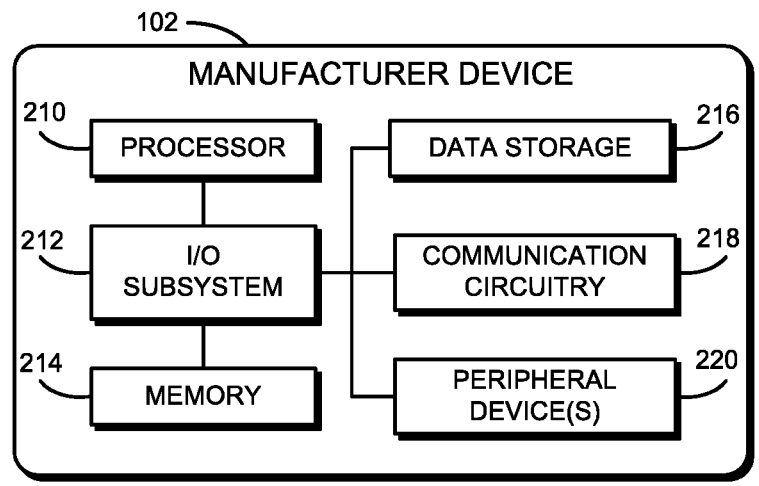
FIG. 2 is a simplified block diagram of at least one embodiment of a manufacturer device of the system of FIG. 1.

As shown in FIG. 2, the illustrative manufacturer device 102 includes a processor 210, an input/output ("I/O") subsystem 212, a memory 214, a data storage 216, a communication circuitry 218, and one or more peripheral devices 220. Of course, the manufacturer device 102 may include other or additional components, such as those commonly found in a typical computing device (e.g., various input/output devices, peripheral devices, and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the corresponding manufacturer device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the manufacturer device 102. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the manufacturer device 102, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the manufacturer device 102 as described herein.

The communication circuitry 218 may be embodied as any communication circuit, device, or collection thereof, capable of enabling communications between the manufacturer device 102 and other remote devices over a network (e.g., the network 104). The communication circuitry 218 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 220 may include any number of additional peripheral or interface devices, such as speakers, microphones, additional storage devices, and so forth. The particular devices included in the peripheral devices 220 may depend on, for example, the type and/or intended use of the manufacturer device 102.

Referring back to FIG. 1, the network 104 may be embodied as any type of communication network capable of facilitating communication between the manufacturer device 102 and remote devices (e.g., the compute device 106). As such, the network 104 may include one or more networks, routers, switches, computers, and/or other intervening devices. For example, each network 104 may be embodied as or otherwise include one or more cellular networks, telephone networks, local or wide area networks, publicly available global networks (e.g., the Internet), an ad hoc network, or any combination thereof. As shown in FIG. 1, in some embodiments, the network 104 may include a remediation network 118. In some embodiments, the remediation network 118 serves as a secure out-of-band network to permit a device to be isolated until its security has been confirmed (e.g., during device discovery and/or commissioning).

In some embodiments, the compute device 106, the distribution device 108, the retailer device 110, the buyer devices 112, the rendezvous servers 114, and/or the clearinghouse device 116 may include components similar to those of the manufacturer device 102 discussed above. The description of those components of the manufacturer device 102 is equally applicable to the description of components of the compute device 106, the distribution device 108, the retailer device 110, the buyer devices 112, the rendezvous servers 114, and/or the clearinghouse device 116 and is not repeated herein for clarity of the description. Further, it should be appreciated that the compute device 106, the distribution device 108, the retailer device 110, the buyer devices 112, the rendezvous servers 114, and/or the clearinghouse device 116 may include other components, sub-components, and devices commonly found in a computing device, which are not discussed above in reference to the manufacturer device 102 and not discussed herein for clarity of the description. In some embodiments, one or more of the components of the manufacturer device 102 may be omitted from the compute device 106, the distribution device 108, the retailer device 110, the buyer devices 112, the rendezvous servers 114, and/or the clearinghouse device 116.

Figure 3:
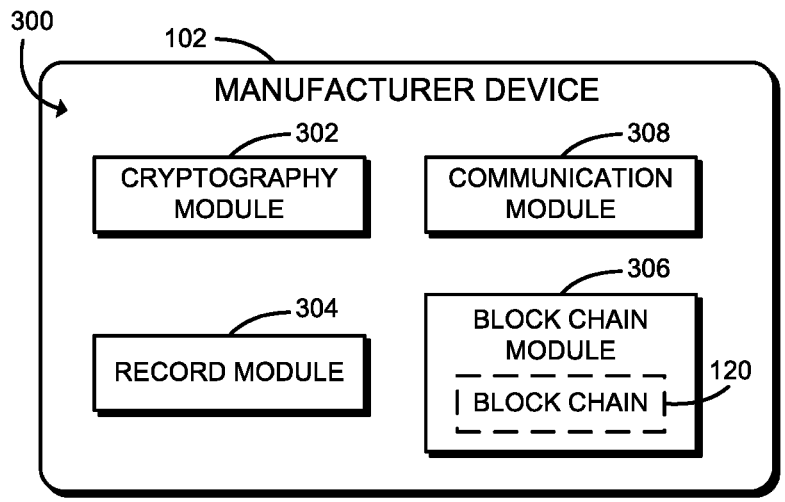
FIG. 3 is a simplified block diagram of at least one embodiment of an environment of the manufacturer device of FIG. 2.

Referring now to FIG. 3, in use, the manufacturer device 102 establishes an environment 300 for device commissioning. The illustrative environment 300 includes a cryptography module 302, a record module 304, a block chain module 306, and a communication module 308. The various modules of the environment 300 may be embodied as hardware, software, firmware, or a combination thereof. For example, the various modules, logic, and other components of the environment 300 may form a portion of, or otherwise be established by, the processor 210 or other hardware components of the manufacturer device 102. As such, in some embodiments, one or more of the modules of the environment 300 may be embodied as circuitry or collection of electrical devices (e.g., a cryptography circuitry, a record circuitry, a block chain circuitry, and/or a communication circuitry). Additionally, in some embodiments, one or more of the illustrative modules may form a portion of another module and/or one or more of the illustrative modules may be independent of one another. Further, in some embodiments, one or more of the modules of the environment 300 may be omitted from a particular manufacturer device 102.

The cryptography module 302 is configured to perform various cryptographic and/or security functions on behalf of the manufacturer device 102. In some embodiments, the cryptography module 302 may be embodied as a cryptographic engine, an independent security co-processor of the manufacturer device 102, a cryptographic accelerator incorporated into the processor 210, or a standalone software/firmware. Depending on the particular embodiment, the cryptography module 302 may generate and/or utilize various cryptographic keys (e.g., symmetric/asymmetric cryptographic keys) for encryption, decryption, signing, and/or signature verification. Further, in some embodiments, the cryptography module 302 may generate cryptographic hashes of various data (e.g., using keyed or un-keyed hashes). Additionally, in some embodiments, the cryptography module 302 may establish a secure connection with remote devices over a network. It should further be appreciated that, in some embodiments, the cryptography module 302 and/or another module of the manufacturer device 102 may establish a trusted execution environment or secure enclave within which a portion of the data described herein may be stored and/or a number of the functions described herein may be performed.

The record module 304 is configured to generate a record that may be added to the block chain 120. For example, as described below, the record module 304 of the manufacturer device 102 may generate a device manufacture record (DMR) that includes several device attributes of the manufactured compute device 106, which may be cryptographically signed by a private cryptographic key of the manufacturer device 102. In the illustrative embodiment, the DMR may include attributes such as the public cryptographic key of the intended distributor (i.e., of the distribution device 108), a unique identifier of the manufactured compute device 106 (e.g., a UUID), data regarding a device "type" of the compute device 106, make/model/version information regarding the compute device 106, a public cryptographic key corresponding with a private cryptographic key (e.g., an EPID key) provisioned to the compute device 106, and/or a cryptographic hash of data associated with the rendezvous server 114 (e.g., a cryptographic hash of the cryptographic public key of the rendezvous server 114), and/or other attributes. Of course, the record module 304 may generate a record that includes additional, or alternative, suitable attributes in other embodiments.

The block chain module 306 is configured to update the block chain 120 corresponding with the compute device 106 to include the device manufacture record (DMR) and/or other suitable data as described herein. In the illustrative embodiment, it should be appreciated that inclusion of the DMR and/or other data by the manufacturer device 102 to the block chain 120 virtually guarantees that the data will be fixed forever and therefore trustworthy. As such, in some embodiments, it may be unnecessary to utilize a certificate provided by a certificate authority in a public key infrastructure to serve as the root of trust. As described herein, in some embodiments, the block chain 120 may be stored by the clearinghouse device 116, whereas in other embodiments, the block chain 120 may be distributed across multiple devices of the system 100 and periodically synchronized across devices.

The communication module 308 is configured to handle the communication between the manufacturer device 102 and other computing devices of the system 100. It should be appreciated that the communication module 308 may utilize any suitable algorithm or protocol for such communication.

Figure 4:
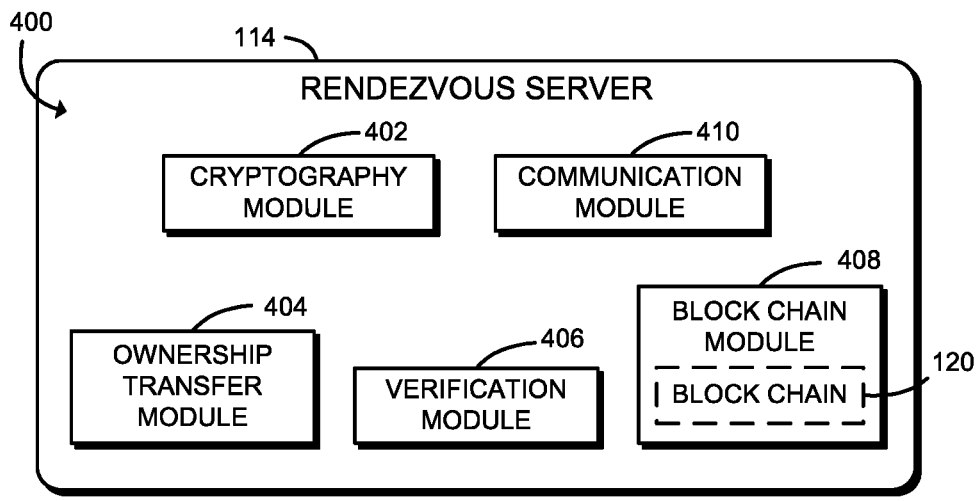
FIG. 4 is a simplified block diagram of at least one embodiment of an environment of the rendezvous server of FIG. 1.

Referring now to FIG. 4, in use, the rendezvous server 114 establishes an environment 400 for device commissioning. The illustrative environment 400 includes a cryptography module 402, an ownership transfer module 404, a verification module 406, a block chain module 408, and a communication module 410. The various modules of the environment 400 may be embodied as hardware, software, firmware, or a combination thereof. For example, the various modules, logic, and other components of the environment 400 may form a portion of, or otherwise be established by, the processor or other hardware components of the rendezvous server 114. As such, in some embodiments, one or more of the modules of the environment 400 may be embodied as circuitry or collection of electrical devices (e.g., a cryptography circuitry, an ownership transfer circuitry, a verification circuitry, a block chain circuitry, and/or a communication circuitry). Additionally, in some embodiments, one or more of the illustrative modules may form a portion of another module and/or one or more of the illustrative modules may be independent of one another.

The cryptography module 402 of the rendezvous server 114 is configured to perform various cryptographic and/or security functions on behalf of the rendezvous server 114 and may be similar to the cryptography module 302 of the manufacturer device 102. As such, in some embodiments, the cryptography module 402 may be embodied as a cryptographic engine, an independent security co-processor of the rendezvous server 114, a cryptographic accelerator incorporated into the processor of the rendezvous server 114, or a standalone software/firmware. Depending on the particular embodiment, the cryptography module 402 may generate and/or utilize various cryptographic keys (e.g., symmetric/asymmetric cryptographic keys) for encryption, decryption, signing, and/or signature verification. Further, in some embodiments, the cryptography module 402 may generate hashes (e.g., cryptographic hashes) of various data (e.g., using keyed or un-keyed hashes). Additionally, in some embodiments, the cryptography module 402 may establish a secure connection with remote devices over a network. It should further be appreciated that, in some embodiments, the cryptography module 402 and/or another module of the rendezvous server 114 may establish a trusted execution environment or secure enclave within which a portion of the data described herein may be stored and/or a number of the functions described herein may be performed.

The ownership transfer module 404 is configured to receive requests to transfer ownership of computing devices (e.g., the compute device 106) from one owner/device to another and to facilitate the transfers based on those requests. As described below, in doing so, the ownership transfer module 404 may communicate with a DANE secure DNS system that permits the onboarding utility of the buyer device 112 to be discovered securely. Additionally, in some embodiments, the ownership transfer module 404 may instruct the compute device 106 to update its ownership to identify the proper buyer of the compute device 106 during a transaction. In some embodiments, the ownership transfer module 404 may also be configured to facilitate the transfer of the rendezvous service to an alternative rendezvous server as described below.

The verification module 406 is configured to review the block chain entries of the block chain 120 associated with the compute device 106 to be transferred to determine the sequence of events that led to a device token being delivered to the rendezvous server 114 requesting transfer of ownership. Further, in some embodiments, the verification module 406 may require the compute device 106 to perform an attestation using an attestation key of the compute device 106 (e.g., its private EPID key), which may be verified by the verification module 406.

The block chain module 408 of the rendezvous server 114 is configured to update the block chain 120 to indicate, for example, that two buyer devices 112 have selected an alternative rendezvous server to facilitate the transfer of ownership of a compute device 106 and/or for other suitable purposes. As described herein, in some embodiments, the block chain 120 may be stored by the clearinghouse device 116, whereas in other embodiments, the block chain 120 may be distributed across multiple devices of the system 100 and periodically synchronized across devices.

The communication module 410 is configured to handle the communication between the rendezvous server 114 and other computing devices of the system 100. It should be appreciated that the communication module 410 may utilize any suitable algorithm or protocol for such communication.

It should be appreciated that the compute device 106, the distribution device 108, the retailer device 110, the buyer devices 112, and/or the clearinghouse device 116 may establish environments similar to the environment 300 of the manufacturer device 102 and/or the environment 400 of the rendezvous server 114. As such, each of those corresponding environments may include modules similar to the environments 300, 400, the description of which is equally applicable to the modules of the compute device 106, the distribution device 108, the retailer device 110, the buyer devices 112, and/or the clearinghouse device 116 and omitted for clarity of the description. For example, in some embodiments, the buyer devices 112 may establish an environment similar to the environment 300 of the manufacturer device 102 and, therefore, may include a similar cryptography module, record module, block chain module, and/or communication module. Of course, the buyer devices 112 and/or other devices of the system 100 may include other modules not shown for simplicity of the description. For example, in some embodiments, the buyer device 112 may include an ownership management module to perform various features associated with transferring ownership of the compute device 106 (e.g., determining to utilize an alternative rendezvous server 114 for transfer of ownership of the compute device 106, receiving instructions to update a memory of the compute device 106 to indicate an alternative rendezvous server 114 is to be trusted, and/or updating the memory of the compute device 106 accordingly).

Figure 5:
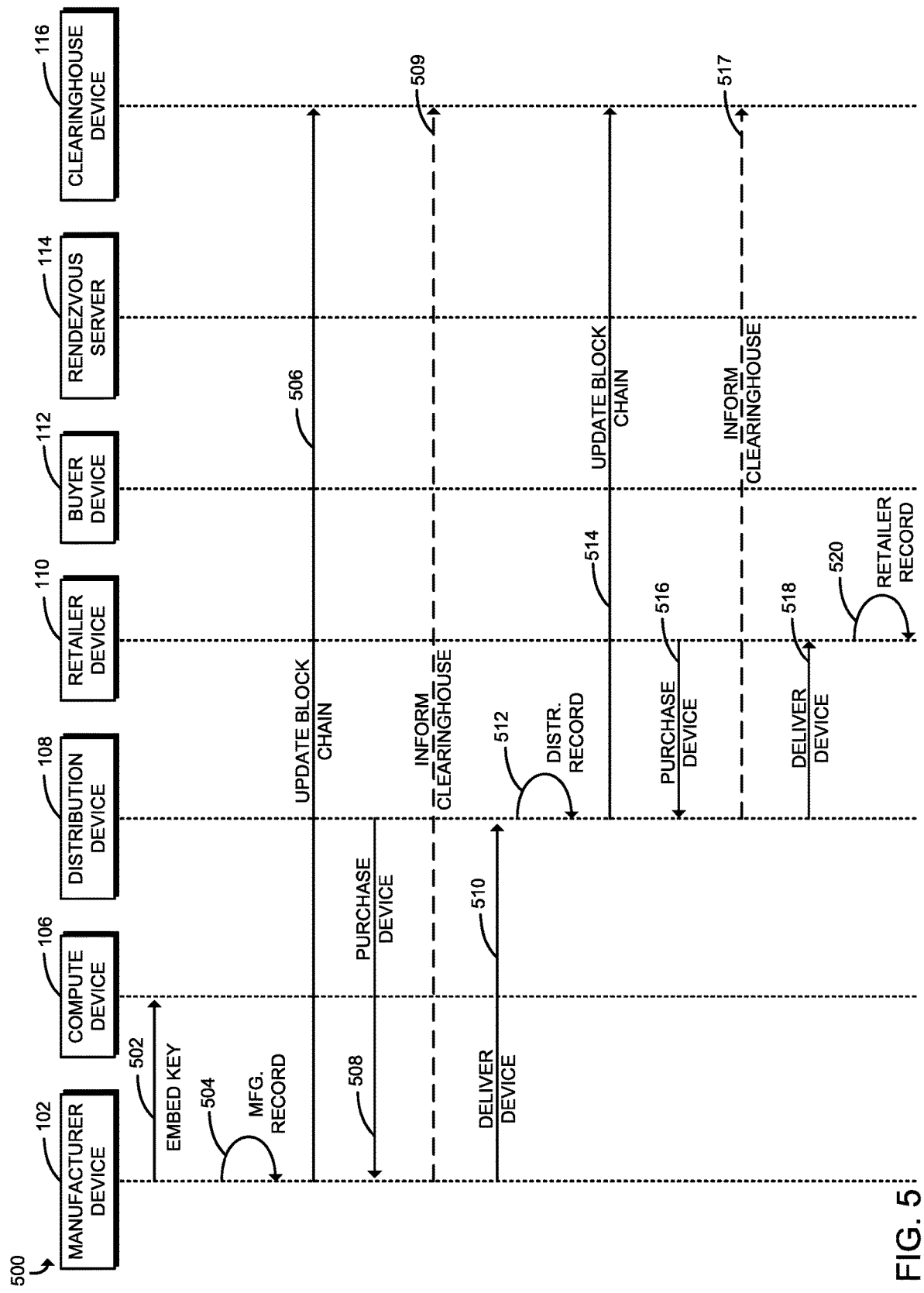
FIGS. 5-6 is a simplified flow diagram of at least one embodiment of a method for commissioning a device.
Figure 6:
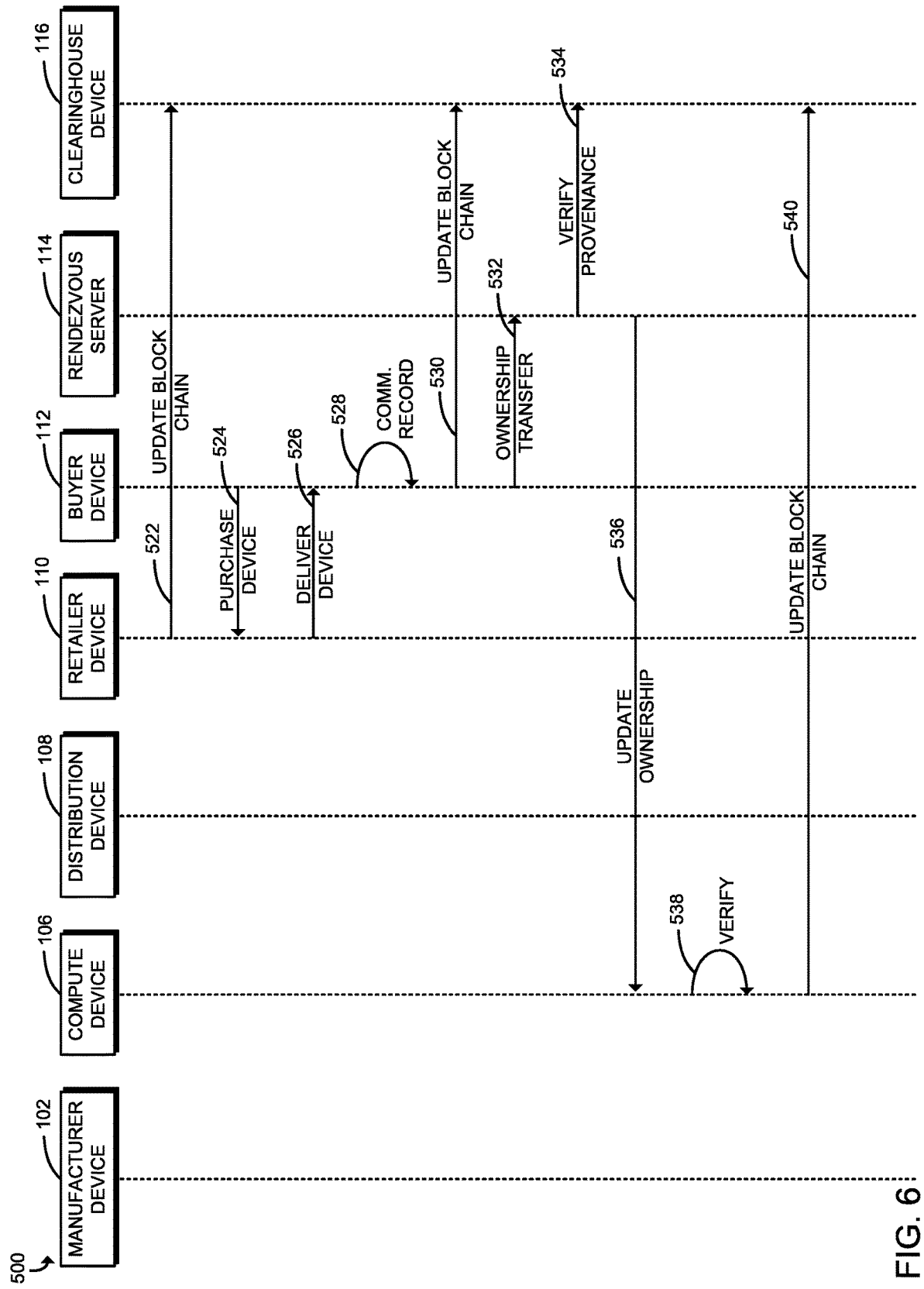

Referring now to FIGS. 5-6, at least one embodiment of a communication flow 500 for device commissioning involves the manufacturer device 102, the compute device 106, the distribution device 108, the retailer device 110, the buyer device 112, the rendezvous device 114, and the clearinghouse device 116 of FIG. 1. It should be appreciated that those devices may communicate with one another over one or more networks 104 and/or remediation networks 118. The illustrative communication flow 500 includes a number of data flows, which may be executed separately or together, depending on the particular embodiment and the particular data flow. As described below, it should be appreciated that several of the devices of the system 100 generate or are otherwise assigned a public-private cryptographic key pair for secure communication.

In the illustrative embodiment, at data flow 502, the manufacturer device 102 embeds an Enhanced Privacy Identification (EPID) private key that identifies the compute device 106 as one manufactured by the manufacturer associated with the manufacturer device 102. It should be appreciated that, in the illustrative embodiment, each compute device 106 is provisioned with a private EPID key that corresponds with a public EPID key (DKm_pub) that identifies the group of devices that have the same make/model/version and/or are of a common device type. In other embodiments, the system 100 may utilize a one-to-many cryptographic scheme different from EPID. Further, in some embodiments, the manufacturer device 102 generates a hash (e.g., a cryptographic hash) of the public cryptographic key of the rendezvous server (SKey) and stores the generated hash to the compute device 106 and/or to the manufacturer device 102 for facilitating device commissioning. It should be appreciated that the public cryptographic key, SKey, may serve as a trust anchor for the rendezvous server 114.

At data flow 504, the manufacturer device 102 creates/generates a device manufacture record (DMR) that includes various attributes of the manufactured compute device 106 and, in some embodiments, cryptographically signs the DMR with a private cryptographic key of the manufacturer device 102 (MKey). For example, in the illustrative embodiment, the DMR includes the public cryptographic key of the intended distribution device 108 (TKey_pub), a unique identifier of the compute device 106 (e.g., a UUID), a device type indicator of the compute device 106, a make-model-version of the compute device 106, the manufacturer-provisioned EPID public key (or hash of the EPID public key) that identifies the manufacturing group to which the device EPID belongs, and a hash of the public cryptographic key of the rendezvous server 114 (SKey_pub) that establishes which rendezvous point is pre-configured into the compute device 106 for completion of device commissioning. In some embodiments, the device type indicator may be embodied as an IPSO, OIC, ALjoyn, UPnP, or other device type identifier that specifies the type and/or function of the compute device 106 (e.g., a refrigerator), and the made-model-version identifier may be a manufacturer-supplied sub-typing that facilitates manufacturing process control. For example, the manufacturer device 102 may generate a signature, S1, according to S1=Sign$_{MKey}$(Tkey_pub, Device_ID, Device_type, Make-model-version, DKm_pub, Hash(Skey)). It should be appreciated that the signature, S1, binds the device attributes, thereby creating a digital instance of a device token that is subject to device ownership assertion. Further, in some embodiments, the manufacturer key and signing operation (or other operations described herein) may be security hardened by virtue of a trusted execution environment (TEE) technology (e.g., Intel SGX, ARM TrustZone, Intel MemCore, Intel CSME/CSE, Intel Trust Technology, Intel TXT, Intel Secure Transfer Monitor (STM)) or secure element (SE) technology (e.g., Trusted Platform Module (TPM), a smartcard, a hardware security module (HSM)).

At data flow 506, the manufacturer device 102 generates a hash (e.g., a cryptographic hash) of the signature, S1, and updates the block chain 120 with that hash under the authority of the public cryptographic key, MKey_pub, of the manufacturer device 102. In some embodiments, the block chain 120 records that the manufacturer has made certain instances of a particular device or, more particularly, that the manufacturer has made certain "tokens" associated with those instances. It should be appreciated that, in some embodiments, the block chain 120 may be utilized to detect a discrepancy between the tokens produced and the physical devices produced.

At data flow 508, a financial transaction may take place in which the distributor purchases the compute device 106 from the manufacturer. However, if the transaction is based on Bitcoin and the corresponding block chain 120, the bitcoin transaction clearing may serve dual purposes. In particular, the financial transaction may be cleared, and the signature, S1, and the cryptographic key, MKey, of the manufacturer device 102 may be recorded to the block chain 120. In some embodiments, MKey may be further utilized as a Bitcoin key. In other embodiments, MKey and S1 may be supplied as "informative" data that accompanies the Bitcoin transaction. It should be appreciated that once the accompanying data is added to the block chain 120, subsequent clearing operations must incorporate those values to produce the correct next link in the block chain 120, which virtually guarantees that the DMR is fixed forever and trustworthy. As such, in the illustrative embodiment, a certificate for MKey_pub is not required to establish a root of trust; rather, the block chain 120 itself serves as the root of trust. Further, in some embodiments, the clearinghouse device 116 may be notified of the change in purchase status (e.g., via an update to the block chain 120). It should be appreciated that, in embodiments in which the purchase action was performed using Bitcoin, such notifications may be implicit as Bitcoin is an instance of the clearinghouse device 116. In some embodiments of a distributed ledger technology, it should be appreciated that the clearinghouse device 116 may not perform financial transactions directly. As such, in some embodiments, the manufacturer device 102 or other entity that performed the purchase clearing may inform the clearinghouse device 116 in block 509.

At data flow 510, the manufacturer delivers the physical compute device 106 to the distributor named in the DMR. At data flow 512, the distribution device 108 of the distributor generates a device distributor record (DDR) that includes attributes similar to the DMR; however, the public cryptographic key of the intended retailer device 110 (RKey_pub) is identified instead of the public cryptographic key of the distribution device 108 (TKey_pub). Further, the distribution device 108 may generate a signature, S2, according to S2=Sign$_{TKey}$(RKey_pub, Device_ID, Device_type, Make-model-version, DKm_pub, Hash(Skey)). At data flow 514, the distribution device 108 generates a hash (e.g., a cryptographic hash) of the signature, S2, and updates the block chain 120 with that hash.

At data flow 516, the retailer purchases the compute device 106 from the distributor. Accordingly, it should be appreciated that transaction clearing steps similar to those described above in reference to data flow 508 may be performed. As indicated above, in some embodiments of a distributed ledger technology, it should be appreciated that the clearinghouse device 116 may not perform financial transactions directly. As such, in some embodiments, the distribution device 108 or other entity that performed the purchase clearing may inform the clearinghouse device 116 in block 517. Although not shown for clarity of the description, it should be appreciated that similar functions may be performed by the relevant entities throughout the communication flow 500 and/or in one or more of the communication flows 700, 800 described below. At data flow 518, the distributor delivers the physical compute device 106 to the retailer named in the DDR. At data flow 520, the retailer device 110 generates a device retailer record (DRR) that includes attributes similar to the records described above but instead includes the public cryptographic key of the buyer device 112 (BKey_pub). In particular, the retailer device 110 may generate a signature, S3, according to S3=Sign$_{RKey}$(BKey_pub, Device_ID, Device_type, Make-model-version, DKm_pub, Hash(Skey)). Referring now to FIG. 6, at data flow 522, the retailer device 110 generates a hash (e.g., a cryptographic hash) of the signature, S3, and updates the block chain 120 with that hash.

At data flow 524, the buyer purchases the compute device 106 from the retailer. Accordingly, it should be appreciated that the transaction clearings steps similar to those described above in reference to data flow 508 may be performed. At data flow 526, the retailer delivers the physical compute device 106 to the buyer named in the DRR. At data flow 528, the buyer device 112 of the buyer seeking help from the rendezvous server 114 to facilitate/simplify device commissioning generates a device commissioning record (DCR) that names the rendezvous server 114 (e.g., by virtue of the public cryptographic key of the rendezvous server 114, SKey_pub). As indicated above, the hash, Hash(SKey), also identifies the rendezvous server 114. Accordingly, if the retailer device 110 or distribution device 108 identified a different rendezvous server, the block chain 120 would reveal the discrepancy. In some embodiments, the cryptographic hash of the public key of the rendezvous server embedded in the compute device 106 Hash(SKey) is protected from modification by virtue of a trusted execution environment (TEE) or other tamper resistant storage technology. The buyer device 112 may generate a signature, S4, according to S4=Sign$_{BKey}$(SKey_pub, Device_ID, Device_type, Make-model-version, DKm_pub, Hash (Skey)). Further, at data flow 530, the buyer device 112 generates a hash (e.g., a cryptographic hash) of the signature, S4, and updates the block chain 120 with that hash, which is indicative of the buyer's intent to use that particular rendezvous server 114 as its rendezvous point. Further, in some embodiments, the buyer device 112 may include its public cryptographic key, BKey_pub, in the transaction history.

At data flow 532, the buyer device 112 may request a transfer of ownership to take possession of the compute device 106. It should be appreciated that the request may include additional information regarding the buyer's intended commissioning device address and port. In such embodiments, the rendezvous server 114 may communicate with a DANE service to facilitate device discovery and onboarding. Alternatively, the buyer device 112 may provide such information to a DANE service directly.

At data flow 534, the rendezvous server 114 reviews the entries of the block chain 120 to establish the sequence of events that resulted in the device token being delivered to the rendezvous server 114. That is, the rendezvous server 114 verifies the provenance of the compute device 106 based on the block chain 120. As described herein, the block chain 120 identifies each transaction associated with ownership of the compute device 106. If there are one or more inconsistencies in the block chain 120, the request for transfer of ownership may be denied.

At data flow 536, the rendezvous server 114 establishes a secure session with the compute device 106 using the buyer's device commissioning server as proxy. To do so, various techniques may be utilized including, for example, 802.1X, EAP, IPSEC, TLS, DTLS, JOSE, COSE, and/or other suitable technologies. In some embodiments, the proxy may monitor payload information for unexpected results from the rendezvous server 114. For example, the proxy may determine if the rendezvous server 114 redirected processing to a different rendezvous server (e.g., an untrusted rendezvous server) than the rendezvous server 114 that performed the signing operations. Additionally, the rendezvous server 114 requires the compute device 106 to perform an attestation (e.g., generate an attestation quote) using the private EPID key of the compute device 106 (DKm). The rendezvous server 114 may verify that the public EPID key of the compute device 106 (DKm_pub) is associated with the correct manufacturer based on the block chain 120 and the contents of the stored DCR. Further, the rendezvous server 114 may verify the rendezvous server 114 is trusted by the buyer device 112, and the rendezvous server 114 may supply the buyer's ownership key (BKey_pub) to the compute device 106 and assert that the buyer device 112 is the rightful device owner. In other words, the rendezvous server 114 may instruct the compute device 106 to update its ownership to reflect that the buyer device 112 is the new owner.

At data flow 538, the compute device 106 verifies the rendezvous server 114 based on the hash, Hash(SKey_pub), that was provisioned at manufacture of the compute device 106. If the hash is verified, the compute device 106 may record the buyer device 112 as the rightful device owner (e.g., by recording/installing BKey_pub). It should be appreciated that once the device owner key has been configured, the device TEE may block attempts to rewrite that memory by devices other than the new device owner (i.e., the buyer device 112). At data flow 540, the rendezvous server 114 adds an entry to the block chain 120 that includes a hash, Hash(BKey_pub, DCR), linked to the rendezvous server key, SKey, an indicating successful transfer of ownership to the buyer device 112. Additionally, the rendezvous server 114 may further register the buyer's commissioning device with the DANE service in some embodiments. It should be appreciated that the compute device 106 and the buyer's commissioning device may establish a connection directly to perform additional device provisioning such as, for example, configuration of collection-specific device credentials, policies, and settings. Further, the compute device 106 may obtain a DANE record that identifies the buyer's commissioning device address and port. It should further be appreciated that, because of the use of the block chain 120 as described herein, once the first distributor hands off the compute device 106 to another entity, the distributor is unable to re-assert passion of the compute device 106 to hand it off again, thereby eliminating malfeasance susceptibility in that regard. In some embodiments, the exchange of the compute device 106 occurs in a remediation network 118.

Figure 7:
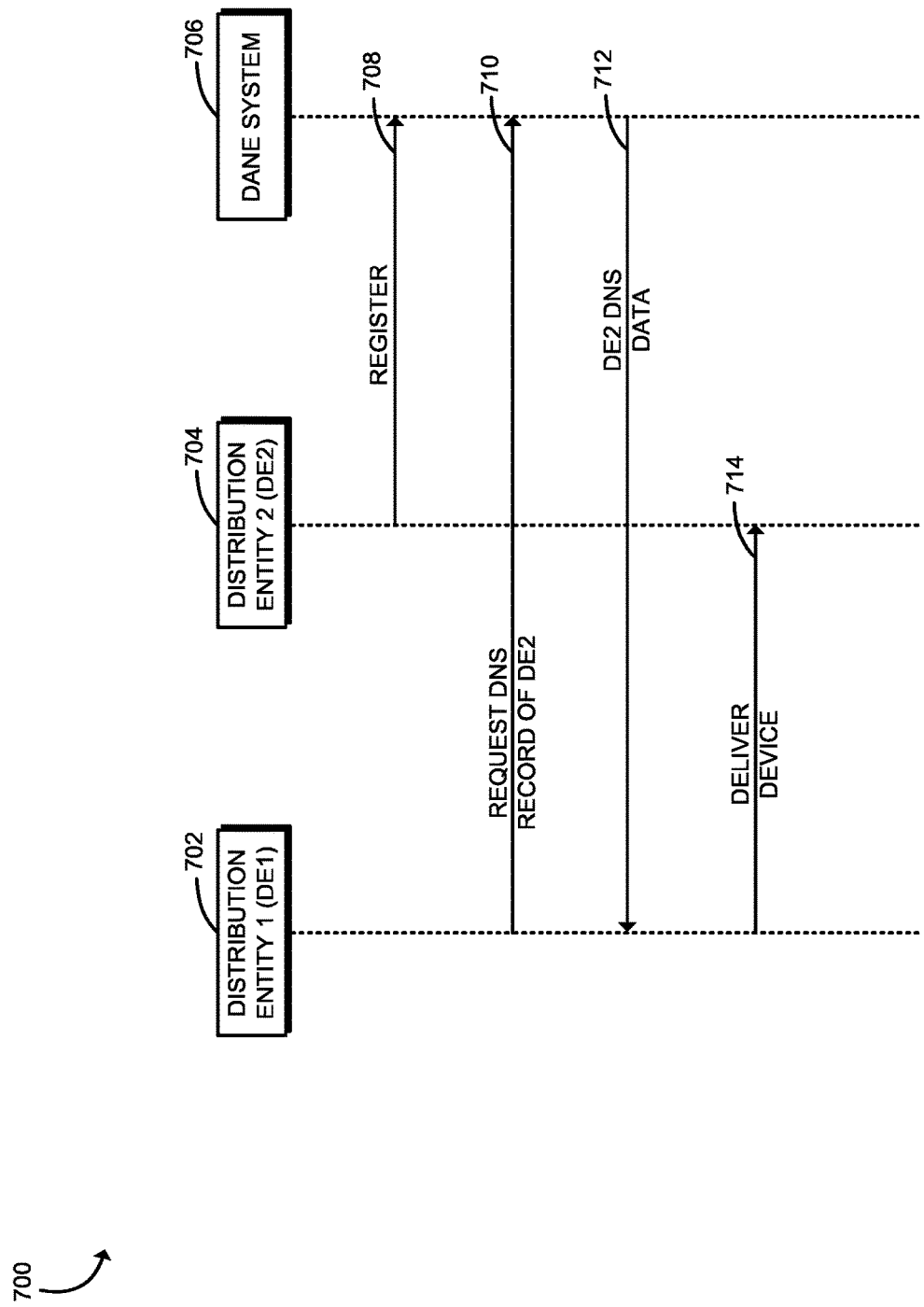
FIG. 7 is a simplified flow diagram of at least one embodiment of a method for interacting with a DANE system.

Referring now to FIG. 7, at least one embodiment of a communication flow 700 for permitting a buyer's onboarding utility to be discovered by a distribution entity involves distribution entities 702, 704 and a DANE system 706. It should be appreciated that one or more of the distribution entities 702, 704 may be a device described above in reference to the system 100 of FIG. 1. It should be appreciated that those devices may communicate with one another over one or more networks 104 and/or remediation networks 118. The illustrative communication flow 700 includes a number of data flows, which may be executed separately or together, depending on the particular embodiment and the particular data flow.

It should be appreciated that, for a given set of compute devices 106 from a manufacturer, the compute devices 106 may be partitioned according to a plurality of buyers, where each buyer may supply a different onboarding utility and a DANE system 706 may choose from various possible onboarding utilities. In some embodiments, the DANE system 706 is informed of the desired onboarding tool by extending the DANE protocol to include a unique device instance identifier (e.g., a UUID) that may be used to select the most appropriate onboarding utility. It should further be appreciated that the UUID may be used by an IoT framework (e.g., OIC or Alljoyn) to establish a connection using a non-IP network such as Bluetooth®, RFID, near-field communication (NFC), and/or other non-IP networks. In some embodiments, the communication flow 700 occurs each time a communication connection is established between two devices of the system 100.

At data flow 708, the distribution entity 704 registers with the DANE system 706 as a "receiver" for devices. In doing so, the distribution entity 704 may generate a cryptographic signature, S1, of the device type, the unique identifier of the device, and/or other parameters. For example, the distribution entity 704 may generate the signature, S1, according to S1=Sign$_{KDE2}$(Device_type, Receiver_UUID, rcvr.de2.com), where KDE2 is the private cryptographic key of the distribution entity 704.

At data flow 710, the distribution entity 702 requests a DNS record for the distribution entity 704, which has registered as a receiver (e.g., rcvr.de2.com). At data flow 712, the DANE system 706 determines the requested DNS data, cryptographically signs the DNS data with the private cryptographic key of the DANE system 706 (KDANE), and transmits the signed DNS data to the distribution entity 702. In particular the DANE system 706 may generate the signature, S2, according to S2=Sign$_{KDANE}$(Device_type, Receiver_UUID, <port>:<ip-address>, KDE2_pub). At data flow 714, the distribution entity 702 delivers the device to the distribution entity 704. As indicated above, in doing so, the unique identifier (e.g., UUID) may be used to establish a communication connection via Bluetooth®, NFC, RFID, or another suitable IoT protocol.

Figure 8:
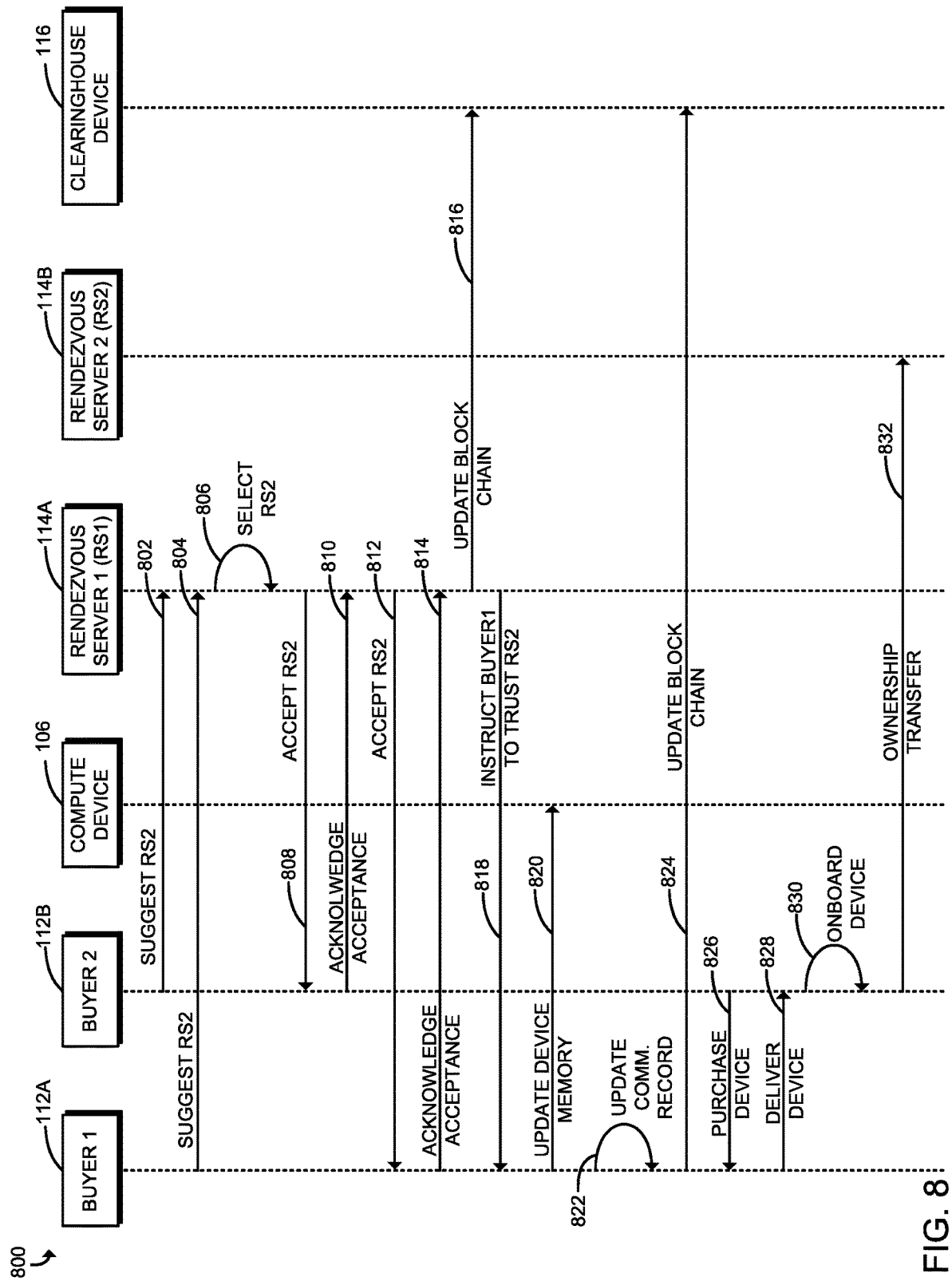
FIG. 8 is a simplified flow diagram of at least one embodiment of a method for transferring ownership of a compute device.

Referring now to FIG. 8, at least one embodiment of a communication flow 800 for transferring ownership of a compute device 106 involves buyer devices 112A, 112B, the compute device 106, rendezvous servers 114A, 114B, and the clearinghouse device 116. It should be appreciated that those devices may communicate with one another over one or more networks 104 and/or remediation networks 118. The illustrative communication flow 800 includes a number of data flows, which may be executed separately, together, or in a different order, depending on the particular embodiment and the particular data flow. In some embodiments, the rendezvous servers 114A, 114B may be embodied as the same server (e.g., different instances of a block chain clearinghouse). In such embodiments, the rendezvous servers 114A, 114B may achieve the same level of trust that is afforded a block chain due to its distributed nature and synchronization algorithm, which requires a majority of nodes to collude before an accepted truth is overturned.

It should be appreciated that the communication flow 800 illustrates a resale method in which there is negotiation of a subsequent rendezvous server 114B (i.e., instead of the originally selected rendezvous server 114A) and subsequent sale processing from the buyer device 112A (e.g., the initial buyer described above in reference to flow 600) to the buyer device 112B using the newly selected rendezvous server 114B. For clarity of the description, the buyer device 112A and the buyer device 112B may be referred to herein as the original buyer device 112A and the subsequent buyer device 112B; of course, in some embodiments, the buyer device 112A itself may be a subsequent buyer device (i.e., having purchased the compute device 106 from the initial buyer or other intermediate buyer). Similarly, the rendezvous server 114A and the rendezvous server 114B may be referred to herein as the original rendezvous server 114A and the subsequent rendezvous server 114B for clarity of the description.

It should be appreciated that data flows 802-820 illustrate the process of replacing the hash, Hash(SKey), which is stored in secure storage (e.g., within a TEE) of the compute device 106 as described above. To do so, the buyer devices 112A, 112B agree on the subsequent rendezvous server 114B to use to facilitate the transfer of ownership.

At data flows 802-804, the subsequent buyer device 112B and the original buyer device 112A suggest that the subsequent rendezvous server 114B be used. In particular, at data flow 802, the subsequent buyer device 112B may cryptographically sign the public cryptographic key of the subsequent rendezvous server 114B (KRS2) with the private cryptographic key of the subsequent buyer device 112B (KB2) and transmit the signed message, S1=Sign$_{KB2}$(KRS2) to the original rendezvous server 114A. Similarly, at data flow 804, the original buyer device 112A may cryptographically sign the public cryptographic key of the subsequent rendezvous server 114B (KRS2) with the private cryptographic key of the original buyer device 112A (KB1) and transmit the signed message, S2=Sign$_{KB1}$(KRS2), to the original rendezvous server 114A.

At data flow 806, the original rendezvous server 114A selects the subsequent rendezvous server 114B based on the messages received from the buyer devices 112A, 112B (e.g., based on the received public cryptographic key of the rendezvous server 114B). At data flow 808, the rendezvous server 114A transmits a message to the subsequent buyer indicating acceptance of the subsequent rendezvous server 114B. For example, in some embodiments, the rendezvous server 114A may cryptographically sign the messages received from the buyer devices 112A, 112B with a private cryptographic key of the rendezvous server 114A (KRS1) and transmit the signed message to the subsequent buyer 112B. In particular, the rendezvous server 114A may transmit the signed message, S3=Sign$_{KRS1}$(S1, S2), to the subsequent buyer device 112B. At data flow 810, the subsequent buyer device 112B may acknowledge acceptance of the rendezvous server 114B, for example, by signing the acceptance message, S3, with the private cryptographic key of the buyer device 112B and transmitting the signed message, S4=Sign$_{KB2}$(S3), to the rendezvous server 114A. At data flow 812, the rendezvous server 114A transmits a message to the original buyer indicating acceptance of the subsequent rendezvous server 114B. In particular, in some embodiments, the rendezvous server 114A may transmit the signed message, S3, to the original buyer device 112A. At data flow 814, the original buyer device 112A may acknowledge the acceptance of the rendezvous server 114B, for example, by signing the acceptance message, S3, with the private cryptographic key of the original buyer device 112I and transmitting the signed message, S5=Sign$_{KB1}$(S3), to the rendezvous server 114A.

At data flow 816, the rendezvous server 114A updates the block chain 120 to indicate agreement of the buyer devices 112A, 112B to utilize the subsequent/alternative rendezvous server 114B. As described above, the block chain 120 identifies each transaction associated with the ownership of the compute device 106. In particular, the rendezvous server 114A may cryptographically sign the acknowledge messages received from the buyer devices 112A, 112B with the private cryptographic key of the rendezvous server 114A and add the signed message, S6=Sign$_{KRS1}$(S4,S5), to the block chain 120. Further, at data flow 818, the rendezvous server 114A may instruct the original buyer device 112A to trust the subsequent rendezvous server 114B for transfer of device ownership. For example, the rendezvous server 114A may transmit the signed message, S6, to the buyer device 112A and/or instruct the buyer device 112A to update the memory of the compute device 106 to include to the hash of the public cryptographic key of the subsequent rendezvous server 114B Hash(KRS2_pub) instead of the original rendezvous server 114A.

At data flow 820, the buyer device 112A updates the memory of the compute device 106 to include the hash of the subsequent rendezvous server 114B, Hash(KRS2_pub), thereby instructing the compute device 106 to trust the subsequent rendezvous server 114B. At data flow 822, in preparation for device resale, the buyer device 112A updates the device commissioning record (DCR) to identify the intended subsequent buyer device 112B and subsequent rendezvous server 114B. Additionally, in some embodiments, the DeviceID of the compute device 106 may be replaced with another DeviceID2, for example, to prevent the informing of the subsequent buyer 112B of a device identifier that may be used to correlate device transactions while in deployment for the buyer device 112A. In particular, in some embodiments, the buyer device 112A may update and cryptographically sign the DCR with the private cryptographic key of the buyer device 112A to generate the signed message, $S7=Sign_{KB1}(KB2, DeviceID2, Device\_type, Make-model-version, DKm\_pub, Hash(KRS2))$. At data flow 824, the buyer device 112A updates the block chain 120 to identify the subsequent buyer device 112B and confirm the selection of the subsequent rendezvous server 114B. In particular, in some embodiments, the buyer device 112A cryptographically signs the signed messages, S6 and S7, with the cryptographic signature key of the buyer device 112A and adds the signed message, $S8=Sign_{KB1}(S7, S6)$, to the block chain 120.

It should be appreciated that the replacement of the original rendezvous server 114A with the subsequent rendezvous server 114B may be verified through the block chain entries of the block chain 120 before the buyer device 112B completes a financial transaction releasing funds to the buyer device 112A. If the buyer device 112B determines to proceed with the financial transaction (e.g., if the block chain 120 is validated), the buyer device 112B purchases the compute device 106 from the buyer device 112A at data flow 826 (e.g., via Bitcoin or another suitable cryptocurrency) at data flow 826. At data flow 828, the original buyer (i.e., associated with the buyer device 112A) physically delivers the compute device 106 to the subsequent buyer (i.e., associated with the buyer device 112B). At data flow 830, the buyer device 112B begins to onboard the compute device 106 using RS2 and, at data flow 832, the buyer device 112B communicates with the subsequent rendezvous server 114B to perform the ownership transfer.

It should be appreciated that, in some embodiments, a block chain clearing processor (e.g., the clearinghouse device 116) is competing with other clearing processors for the right to update the block chain 120 and may be paid a micropayment if they win such a right. For example, the Bitcoin protocol permits the winner of such a right to include ancillary information into the hash contributed to the point of the chain, which presents an opportunity for clearing processors to maximize value based on the right to update the chain. In particular, the clearing processors may write the hash of one of the messages described herein to the block chain 120 in exchange for a micropayment. As such, rendezvous service providers, retailers, and distributors may compete for block chain clearing services. It should be further appreciated that the use of a block chain 120 may permit other techniques not described herein in detail for brevity of the disclosure. For example, in some embodiments, EPID revocations including signature and private key revocation events may be contributed to the block chain 120, thereby enabling a key status service to support EPID revocation processing. Indeed, a key status service may be utilized by one or more of the devices in the system 100 to monitor the block chain 120 for various key compromise events.

Figure 9:
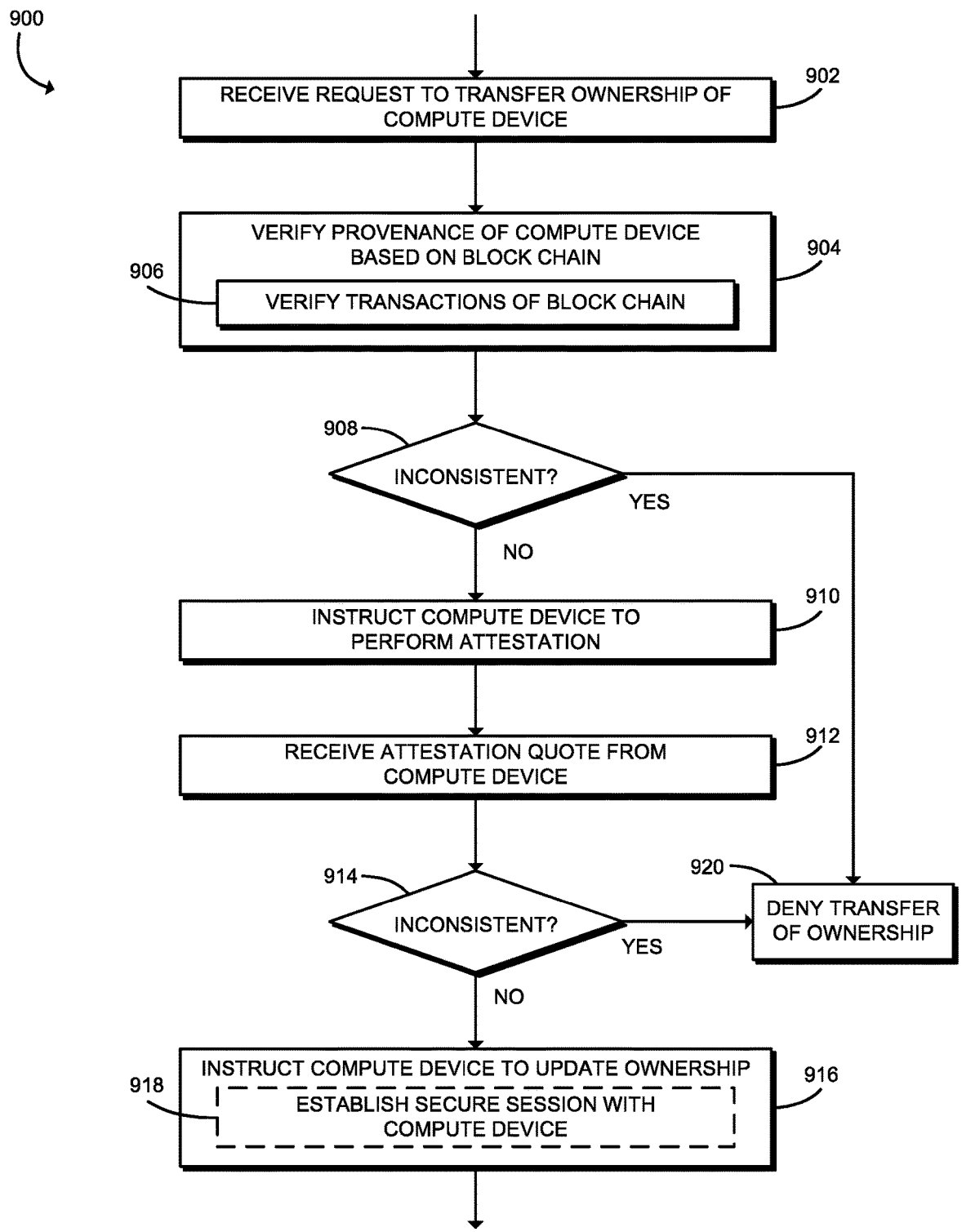
FIG. 9 is a simplified flow diagram of at least one embodiment of a method for commissioning a device that may be executed by the rendezvous server of FIG. 1.

Referring now to FIG. 9, in use, the rendezvous server 114 may execute a method 900 for device commissioning. It should be appreciated that, in some embodiments, the techniques of the method 900 may be executed by one or more of the modules of the environment 400 of the rendezvous server 114 as shown in FIG. 4. The illustrative method 900 begins with block 902 in which the rendezvous server 114 receives a request to transfer ownership of the compute device 106 from the buyer device 112 (see, for example, data flow 532 of FIG. 6). In block 904, the rendezvous server 114 verifies the provenance of the compute device 106 based on the block chain 120. In doing so, in block 906, the rendezvous server 114 may verify the transactions of the block chain 120 (see, for example, data flow 534 of FIG. 6). For example, the rendezvous server 114 may establish the sequence of transactions that resulted in a device token being delivered to the rendezvous server 114 and confirm that there are no inconsistencies associated with the transactions (e.g., transfer duplications, etc.).

If the rendezvous server 114 determines, in block 908, that there are no inconsistencies, the method 900 advances to block 910 in which the rendezvous server 910 instructs the compute device 106 to perform attestation to the rendezvous server 114 using the private EPID key provisioned to the compute device 106 by the manufacturer device 102 during the initial provisioning of the compute device 106 by the manufacturer. In block 912, the rendezvous server 114 receives the attestation quote from the compute device 106 and verifies that the public EPID key of the compute device 106 is associated with the correct manufacturer based on the block chain 120. If the rendezvous server 114 determines, in block 914, that there are no inconsistencies, the method 900 advances to block 916 in which the rendezvous server 114 instructs the compute device 106 to update its ownership (see, for example, data flow 536 of FIG. 6). In doing so, in block 918, the rendezvous server 114 may establish a secure session with the compute device 106 as described above. If the rendezvous server 114 identifies an inconsistency or verification otherwise fails in block 908 or block 914, the rendezvous server 114 may deny the transfer of ownership in block 920. Further, the rendezvous server 114 may perform one or more error handling operations in an attempt to rectify the error and/or notify relevant parties of the error.

Figure 10:
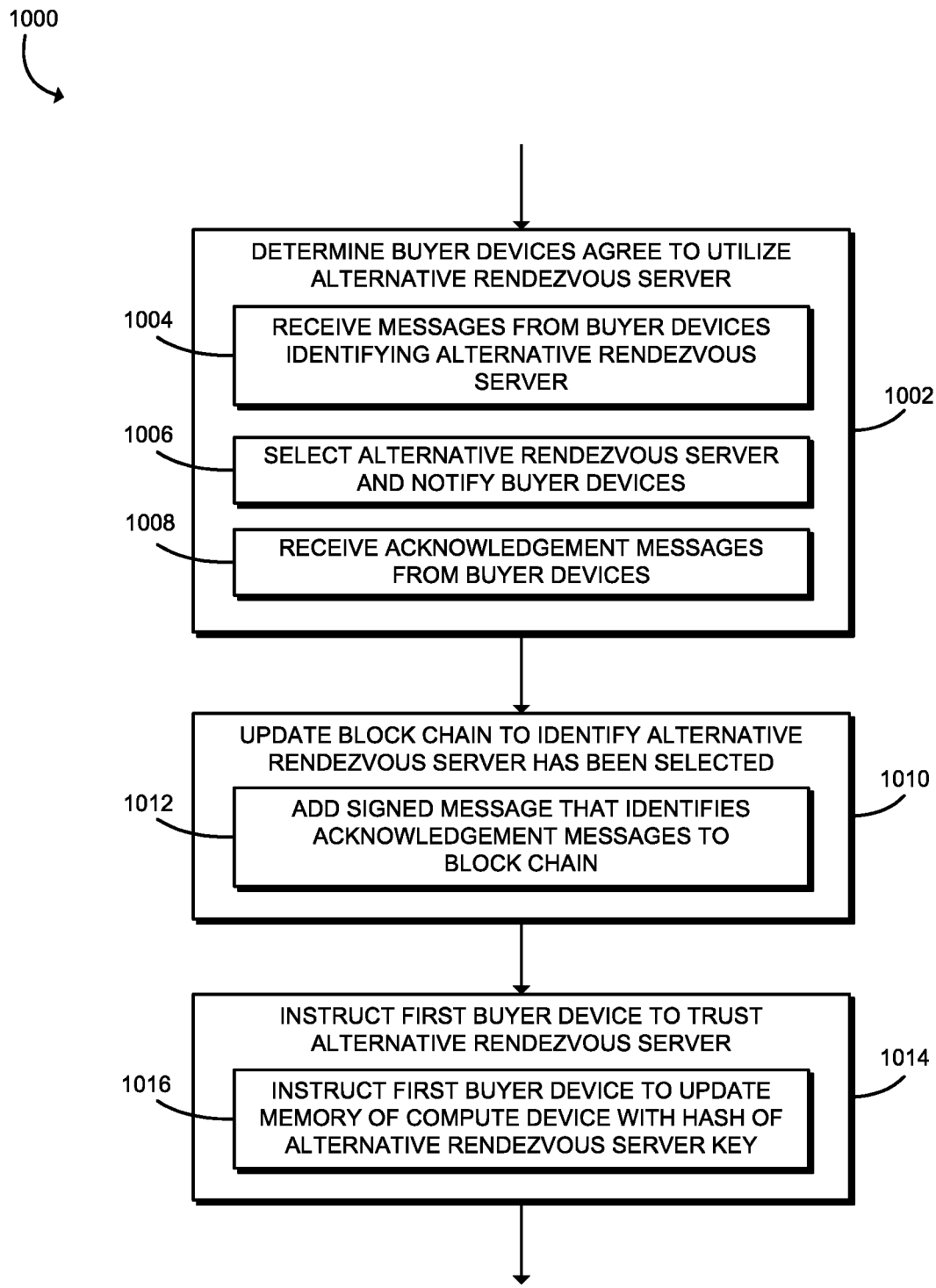
FIG. 10 is simplified flow diagram of at least one embodiment of a method for transferring ownership of a compute device that may be executed by the rendezvous server of FIG. 1.

Referring now to FIG. 10, in use, the rendezvous server 114A may execute a method 1000 for transferring ownership of the compute device 106. It should be appreciated that, in some embodiments, the techniques of the method 1000 may be executed by one or more of the modules of the environment 400 of the rendezvous server 114 as shown in FIG. 4. The illustrative method 1000 begins with block 1002 in which the rendezvous server 114 determines that the buyer devices 112A, 112B agree to utilize an alternative rendezvous server 114B different from the current rendezvous server 114A (see, for example, data flows 802-814 of FIG. 8). In doing so, in block 1004, the rendezvous server 114A may receive messages from the buyer devices 112A, 112B identifying the alternative rendezvous server 114A. In particular, as described above, the rendezvous server 114A may receive a message from the buyer device 112A that is cryptographically signed by the buyer device 112A with a private cryptographic key of that device and identifies a public cryptographic key of the alternative rendezvous server 114B. As indicated above, the rendezvous server 114A may receive a similar message from the buyer device 112B. In block 1006, the rendezvous server 114A selects the alternative rendezvous server 114B and notifies the buyer devices 112A, 112B of the acceptance of that choice (see, for example, data flows 806, 808, 812 of FIG. 8). In block 1008, the rendezvous server 114A receives acknowledgement messages from the buyer devices 112A, 112B (see, for example, data flows 810, 814 of FIG. 8).

In block 1010, the rendezvous server 114A updates the block chain 120 to identify the alternative rendezvous server 114B has been selected (see, for example, data flow 816 of FIG. 8). In doing so, in block 1012, the rendezvous server 114A may cryptographically sign a message that includes the acknowledgement messages of the buyer devices 112A, 112B with a private cryptographic key of the rendezvous server 114A and add the signed message to the block chain 120. In block 1014, the rendezvous server 114A instructs the buyer device 112A to trust the alternative rendezvous server 114B (see, for example, data flow 818 of FIG. 8). In doing so, the rendezvous server 114A may instruct the buyer device 112A to update the memory of the compute device 106 to replace a hash of the public cryptographic key of the rendezvous server 114A stored thereon with a hash of the public cryptographic key of the alternative rendezvous server 114B.

Figure 11:
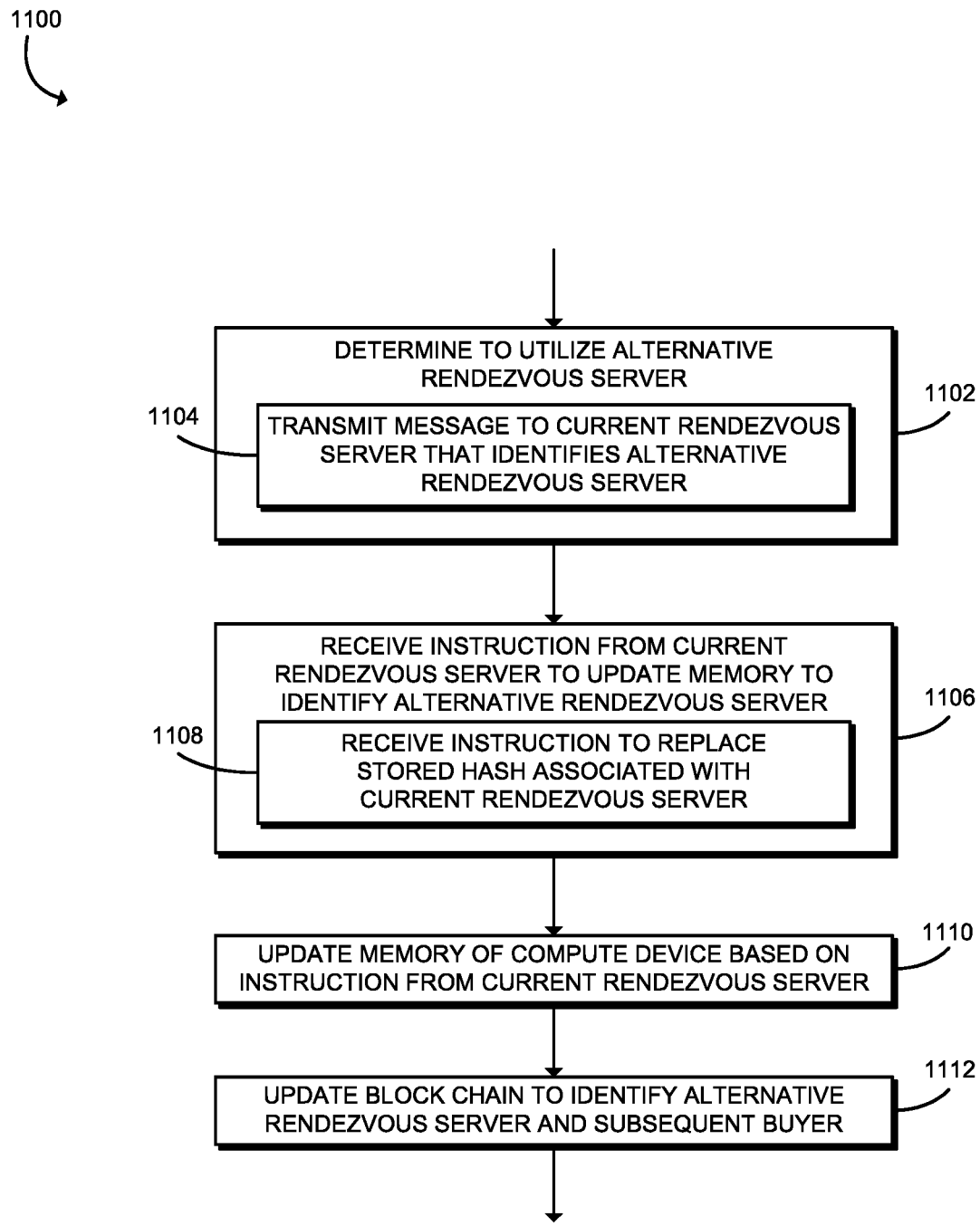
FIG. 11 is a simplified flow diagram of at least one embodiment of a method for transferring ownership of a compute device that may be executed by the buyer device of FIG. 1.

Referring now to FIG. 11, in use, the buyer device 112A may execute a method 1100 for transferring ownership of the compute device 106. It should be appreciated that, in some embodiments, the techniques of the method 1100 may be executed by one or more of the modules of the environment of the buyer device 112A as described above. The illustrative method 1100 begins with block 1102 in which the buyer device 112A determines to utilize the alternative rendezvous server 114B. In particular, in block 1104, the buyer device 112A may transmit a message to the current rendezvous server 114A that identifies the alternative rendezvous server 114B as described above (see, for example, data flow 802 of FIG. 8). For example, the buyer device 112A may cryptographically sign a public cryptographic key of the alternative rendezvous server 114B with a private cryptographic key of the buyer device 112A and transmit the signed message to the current rendezvous server 114A.

In block 1106, the buyer device 112A receives an instruction from the current rendezvous server 114A to update the memory of the compute device 106 to identify the alternative rendezvous server 114B (see, for example, data flow 818 of FIG. 8). In particular, in block 1108, the buyer device 112A may receive an instruction from the current rendezvous server 114A to replace a hash of the public cryptographic key of the current rendezvous server 114A stored in the memory of the compute device 106 with a hash of the public cryptographic key of the alternative rendezvous server 114B. Of course, it should be appreciated that the instruction to update the memory of the compute device 106 may include various identifying information and/or other data such as, for example, a URL, IP address, UUID, or another identifier that may be used to identifier the rendezvous server 114. In block 1110, the buyer device 112A updates the memory of the compute device 106 accordingly based on the instruction received from the current rendezvous server 114A. In block 1112, the buyer device 112A updates the block chain 120 to identify the alternative rendezvous server 114B and the subsequent buyer device 112B as described above (see, for example, data flow 824 of FIG. 8).

EXAMPLES

Illustrative examples of the technologies disclosed herein are provided below. An embodiment of the technologies may include any one or more, and any combination of, the examples described below.

Example 1 includes a rendezvous server for device commissioning, the rendezvous server comprising an ownership transfer module to receive, from a buyer device, a request to transfer ownership of a compute device to the buyer device; and a verification module to verify provenance of the compute device based on a block chain, wherein the block chain identifies each transaction associated with ownership of the compute device; wherein the ownership transfer module is further to instruct the compute device to update its ownership to identify the buyer device as the owner.

Example 2 includes the subject matter of Example 1, and wherein to receive the request to transfer the ownership of the compute device comprises to receive a device token associated with a transfer of device ownership.

Example 3 includes the subject matter of any of Examples 1 and 2, and wherein to verify the provenance of the compute device comprises to establish a sequence of transactions that resulted in a device token being delivered to the rendezvous server associated with the request to transfer the ownership of the compute device.

Example 4 includes the subject matter of any of Examples 1-3, and wherein to verify the provenance of the compute device comprises to deny the request to transfer the ownership of the compute device in response to identification of on inconsistency in the block chain.

Example 5 includes the subject matter of any of Examples 1-4, and wherein to instruct the compute device to update its ownership comprises to establish a secure session with the compute device in response to verification of the provenance.

Example 6 includes the subject matter of any of Examples 1-5, and wherein to establish the secure session with the compute device comprises to use a commissioning server of the buyer device as a proxy.

Example 7 includes the subject matter of any of Examples 1-6, and wherein the verification module is further to instruct the compute device to perform an attestation to the rendezvous server using a private Enhanced Privacy Identification (EPID) key provisioned to the compute device by a manufacturer of the compute device.

Example 8 includes the subject matter of any of Examples 1-7, and wherein the verification module is further to verify that a public EPID key of the compute device is associated with a correct manufacturer based on the block chain.

Example 9 includes the subject matter of any of Examples 1-8, and wherein the block chain includes a device commissioning record stored by the buyer device that identifies the rendezvous server.

Example 10 includes the subject matter of any of Examples 1-9, and wherein the device commissioning record includes a hash of a public cryptographic key of the rendezvous server.

Example 11 includes a method for device commissioning by a rendezvous server, the method comprising receiving, by the rendezvous server and from a buyer device, a request to transfer ownership of a compute device to the buyer device; verifying, by the rendezvous server, provenance of the compute device based on a block chain, wherein the block chain identifies each transaction associated with ownership of the compute device; and instructing, by the rendezvous server, the compute device to update its ownership to identify the buyer device as the owner.

Example 12 includes the subject matter of Example 11, and wherein receiving the request to transfer the ownership of the compute device comprises receiving a device token associated with a transfer of device ownership.

Example 13 includes the subject matter of any of Examples 11 and 12, and wherein verifying the provenance of the compute device comprises establishing a sequence of transactions that resulted in a device token being delivered to the rendezvous server associated with the request to transfer the ownership of the compute device.

Example 14 includes the subject matter of any of Examples 11-13, and wherein verifying the provenance of the compute device comprises denying the request to transfer the ownership of the compute device in response to identification of on inconsistency in the block chain.

Example 15 includes the subject matter of any of Examples 11-14, and wherein instructing the compute device to update its ownership comprises establishing a secure session with the compute device in response to verification of the provenance.

Example 16 includes the subject matter of any of Examples 11-15, and wherein establishing the secure session with the compute device comprises using a commissioning server of the buyer device as a proxy.

Example 17 includes the subject matter of any of Examples 11-16, and further including instructing the compute device to perform an attestation to the rendezvous server using a private Enhanced Privacy Identification (EPID) key provisioned to the compute device by a manufacturer of the compute device.

Example 18 includes the subject matter of any of Examples 11-17, and further including verifying that a public EPID key of the compute device is associated with a correct manufacturer based on the block chain.

Example 19 includes the subject matter of any of Examples 11-18, and wherein the block chain includes a device commissioning record stored by the buyer device that identifies the rendezvous server.

Example 20 includes the subject matter of any of Examples 11-19, and wherein the device commissioning record includes a hash of a public cryptographic key of the rendezvous server.

Example 21 includes a computing device comprising a processor; and a memory having stored therein a plurality of instructions that when executed by the processor cause the computing device to perform the method of any of Examples 11-20.

Example 22 includes one or more machine-readable storage media comprising a plurality of instructions stored thereon that in response to being executed result in a computing device performing the method of any of Examples 11-20.

Example 23 includes a rendezvous server for device commissioning, the rendezvous server comprising means for receiving, from a buyer device, a request to transfer ownership of a compute device to the buyer device; means for verifying provenance of the compute device based on a block chain, wherein the block chain identifies each transaction associated with ownership of the compute device; and means for instructing the compute device to update its ownership to identify the buyer device as the owner.

Example 24 includes the subject matter of Example 23, and wherein the means for receiving the request to transfer the ownership of the compute device comprises means for receiving a device token associated with a transfer of device ownership.

Example 25 includes the subject matter of any of Examples 23 and 24, and wherein the means verifying the provenance of the compute device comprises means for establishing a sequence of transactions that resulted in a device token being delivered to the rendezvous server associated with the request to transfer the ownership of the compute device.

Example 26 includes the subject matter of any of Examples 23-25, and wherein the means verifying the provenance of the compute device comprises means for denying the request to transfer the ownership of the compute device in response to identification of on inconsistency in the block chain.

Example 27 includes the subject matter of any of Examples 23-26, and wherein the means instructing the compute device to update its ownership comprises means for establishing a secure session with the compute device in response to verification of the provenance.

Example 28 includes the subject matter of any of Examples 23-27, and wherein the means establishing the secure session with the compute device comprises means for using a commissioning server of the buyer device as a proxy.

Example 29 includes the subject matter of any of Examples 23-28, and further including means for instructing the compute device to perform an attestation to the rendezvous server using a private Enhanced Privacy Identification (EPID) key provisioned to the compute device by a manufacturer of the compute device.

Example 30 includes the subject matter of any of Examples 23-29, and further including means for verifying that a public EPID key of the compute device is associated with a correct manufacturer based on the block chain.

Example 31 includes the subject matter of any of Examples 23-30, and wherein the block chain includes a device commissioning record stored by the buyer device that identifies the rendezvous server.

Example 32 includes the subject matter of any of Examples 23-31, and wherein the device commissioning record includes a hash of a public cryptographic key of the rendezvous server.

Example 33 includes a rendezvous server for transferring ownership of a compute device, the rendezvous server comprising an ownership transfer module to determine that a first buyer device and a second buyer device of the compute device agree to utilize an alternative rendezvous server; and a block chain module to update a block chain to indicate agreement of the first buyer device and the second buyer device to utilize the alternative rendezvous server, wherein the block chain identifies each transaction associated with ownership of the compute device; wherein the ownership transfer module is further to instruct the first buyer device to trust the alternative rendezvous server for transfer of ownership of the compute device in response to the update of the block chain.

Example 34 includes the subject matter of Example 33, and wherein to determine that the first buyer device and the second buyer device agree to utilize the alternative rendezvous server comprises to receive a first message from the first buyer device that identifies the alternative rendezvous server; and receive a second message from the second buyer device that identifies the alternative rendezvous server.

Example 35 includes the subject matter of any of Examples 33 and 34, and wherein the first message is cryptographically signed by the first buyer device with a private cryptographic key of the first buyer device and identifies a public cryptographic key of the alternative rendezvous server; and wherein the second message is cryptographically signed by the second buyer device with a private cryptographic key of the second buyer device and identifies the public cryptographic key of the alternative rendezvous server.

Example 36 includes the subject matter of any of Examples 33-35, and wherein the ownership transfer module is further to receive a first acknowledgement message from the first buyer device and a second acknowledgement message from the second buyer device, wherein each of the first and second acknowledgement messages is a confirmation of receipt of a message from the rendezvous server that indicates the alternative rendezvous server has been selected.

Example 37 includes the subject matter of any of Examples 33-36, and wherein to update the block chain comprises to update the block chain with the first acknowledgement message and the second acknowledgement message.

Example 38 includes the subject matter of any of Examples 33-37, and wherein to update the block chain comprises to cryptographically sign a message that includes the first acknowledgement message and the second acknowledgement message with a private cryptographic key of the rendezvous server to generate a signed message; and add the signed message to the block chain.

Example 39 includes the subject matter of any of Examples 33-38, and wherein to instruct the first buyer device to trust the alternative rendezvous server comprises to instruct the first buyer device to update a memory of the compute device to replace a hash of a public cryptographic key of the rendezvous server with a hash of a public cryptographic key of the alternative rendezvous server.

Example 40 includes a method for transferring ownership of a compute device by a rendezvous server, the method comprising determining, by the rendezvous server, that a first buyer device and a second buyer device of the compute device agree to utilize an alternative rendezvous server; updating, by the rendezvous server, a block chain to indicate agreement of the first buyer device and the second buyer device to utilize the alternative rendezvous server, wherein the block chain identifies each transaction associated with ownership of the compute device; and instructing, by the rendezvous server, the first buyer device to trust the alternative rendezvous server for transfer of ownership of the compute device in response to updating the block chain.

Example 41 includes the subject matter of Example 40, and wherein determining that the first buyer device and the second buyer device agree to utilize the alternative rendezvous server comprises receiving a first message from the first buyer device that identifies the alternative rendezvous server; and receiving a second message from the second buyer device that identifies the alternative rendezvous server.

Example 42 includes the subject matter of any of Examples 40 and 41, and wherein the first message is cryptographically signed by the first buyer device with a private cryptographic key of the first buyer device and identifies a public cryptographic key of the alternative rendezvous server; and wherein the second message is cryptographically signed by the second buyer device with a private cryptographic key of the second buyer device and identifies the public cryptographic key of the alternative rendezvous server.

Example 43 includes the subject matter of any of Examples 40-42, and further including receiving a first acknowledgement message from the first buyer device and a second acknowledgement message from the second buyer device, wherein each of the first and second acknowledgement messages is a confirmation of receipt of a message from the rendezvous server that indicates the alternative rendezvous server has been selected.

Example 44 includes the subject matter of any of Examples 40-43, and wherein updating the block chain comprises updating the block chain with the first acknowledgement message and the second acknowledgement message.

Example 45 includes the subject matter of any of Examples 40-44, and wherein updating the block chain comprises cryptographically signing a message that includes the first acknowledgement message and the second acknowledgement message with a private cryptographic key of the rendezvous server to generate a signed message; and adding the signed message to the block chain.

Example 46 includes the subject matter of any of Examples 40-45, and wherein instructing the first buyer device to trust the alternative rendezvous server comprises instructing the first buyer device to update a memory of the compute device to replace a hash of a public cryptographic key of the rendezvous server with a hash of a public cryptographic key of the alternative rendezvous server.

Example 47 includes a computing device comprising a processor; and a memory having stored therein a plurality of instructions that when executed by the processor cause the computing device to perform the method of any of Examples 31-37.

Example 48 includes one or more machine-readable storage media comprising a plurality of instructions stored thereon that in response to being executed result in a computing device performing the method of any of Examples 40-46.

Example 49 includes a rendezvous server for transferring ownership of a compute device, the rendezvous server comprising means for determining that a first buyer device and a second buyer device of the compute device agree to utilize an alternative rendezvous server; means for updating a block chain to indicate agreement of the first buyer device and the second buyer device to utilize the alternative rendezvous server, wherein the block chain identifies each transaction associated with ownership of the compute device; and means for instructing the first buyer device to trust the alternative rendezvous server for transfer of ownership of the compute device in response to updating the block chain.

Example 50 includes the subject matter of Example 49, and wherein the means for determining that the first buyer device and the second buyer device agree to utilize the alternative rendezvous server comprises means for receiving a first message from the first buyer device that identifies the alternative rendezvous server; and means for receiving a second message from the second buyer device that identifies the alternative rendezvous server.

Example 51 includes the subject matter of any of Examples 49 and 50, and wherein the first message is cryptographically signed by the first buyer device with a private cryptographic key of the first buyer device and identifies a public cryptographic key of the alternative rendezvous server; and wherein the second message is cryptographically signed by the second buyer device with a private cryptographic key of the second buyer device and identifies the public cryptographic key of the alternative rendezvous server.

Example 52 includes the subject matter of any of Examples 49-51, and further including means for receiving a first acknowledgement message from the first buyer device and a second acknowledgement message from the second buyer device, wherein each of the first and second acknowledgement messages is a confirmation of receipt of a message from the rendezvous server that indicates the alternative rendezvous server has been selected.

Example 53 includes the subject matter of any of Examples 49-52, and wherein the means for updating the block chain comprises means for updating the block chain with the first acknowledgement message and the second acknowledgement message.

Example 54 includes the subject matter of any of Examples 49-53, and wherein the means for updating the block chain comprises means for cryptographically signing a message that includes the first acknowledgement message and the second acknowledgement message with a private cryptographic key of the rendezvous server to generate a signed message; and means for adding the signed message to the block chain.

Example 55 includes the subject matter of any of Examples 49-54, and wherein the means for instructing the first buyer device to trust the alternative rendezvous server comprises means for instructing the first buyer device to update a memory of the compute device to replace a hash of a public cryptographic key of the rendezvous server with a hash of a public cryptographic key of the alternative rendezvous server.

Example 56 includes a buyer device for transferring ownership of a compute device, the buyer device comprising ownership management module to (i) determine to utilize an alternative rendezvous server for transfer of ownership of the compute device, (ii) receive, from a current rendezvous server, an instruction to update a memory of the compute device to indicate the alternative rendezvous server is trusted, and (iii) update the memory of the compute device to indicate the alternative rendezvous server is a trusted device; and a block chain module to update a block chain to identify the alternative rendezvous server and a subsequent buyer device of the compute device.

Example 57 includes the subject matter of Example 56, and wherein to determine to utilize the alternative rendezvous server comprises to transmit a message that identifies the alternative rendezvous server to the current rendezvous server.

Example 58 includes the subject matter of any of Examples 56 and 57, and wherein to transmit the message that identifies the alternative rendezvous server to the current rendezvous server comprises to cryptographically sign a public cryptographic key of the alternative rendezvous server with a private cryptographic key of the first buyer device to generate a signed message; and transmit the signed message to the current rendezvous server.

Example 59 includes the subject matter of any of Examples 56-58, and wherein to receive the instruction to update the memory comprises to receive an instruction to replace a hash of a public cryptographic key of the current rendezvous server with a hash of a public cryptographic key of the alternative rendezvous server in the memory of the compute device.

Example 60 includes the subject matter of any of Examples 56-59, and wherein to update the block chain to identify the alternative rendezvous server and the subsequent buyer device comprises to cryptographically sign a message with a private cryptographic key of the buyer device, wherein the message identifies a public cryptographic key of the subsequent buyer device and a public cryptographic key of the subsequent rendezvous device.

Example 61 includes the subject matter of any of Examples 56-60, and wherein the current rendezvous server and the alternative rendezvous server are separate instances of a block chain clearinghouse.

Example 62 includes a method for transferring ownership of a compute device by a buyer device, the method comprising determining, by the buyer device, to utilize an alternative rendezvous server for transfer of ownership of the compute device; receiving, by the first buyer device and from a current rendezvous server, an instruction to update a memory of the compute device to indicate the alternative rendezvous server is trusted; updating, by the buyer device, the memory of the compute device to indicate the alternative rendezvous server is a trusted device; and updating, by the buyer device, a block chain to identify the alternative rendezvous server and a subsequent buyer device of the compute device.

Example 63 includes the subject matter of Example 62, and wherein determining to utilize the alternative rendezvous server comprises transmitting a message that identifies the alternative rendezvous server to the current rendezvous server.

Example 64 includes the subject matter of any of Examples 62 and 63, and wherein transmitting the message that identifies the alternative rendezvous server to the current rendezvous server comprises cryptographically signing a public cryptographic key of the alternative rendezvous server with a private cryptographic key of the first buyer device to generate a signed message; and transmitting the signed message to the current rendezvous server.

Example 65 includes the subject matter of any of Examples 62-64, and wherein receiving the instruction to update the memory comprises receiving an instruction to replace a hash of a public cryptographic key of the current rendezvous server with a hash of a public cryptographic key of the alternative rendezvous server in the memory of the compute device.

Example 66 includes the subject matter of any of Examples 62-65, and wherein updating the block chain to identify the alternative rendezvous server and the subsequent buyer device comprises cryptographically signing a message with a private cryptographic key of the buyer device, wherein the message identifies a public cryptographic key of the subsequent buyer device and a public cryptographic key of the subsequent rendezvous device.

Example 67 includes the subject matter of any of Examples 62-66, and wherein the current rendezvous server and the alternative rendezvous server are separate instances of a block chain clearinghouse.

Example 68 includes a computing device comprising a processor; and a memory having stored therein a plurality of instructions that when executed by the processor cause the computing device to perform the method of any of Examples 47-52.

Example 69 includes one or more machine-readable storage media comprising a plurality of instructions stored thereon that in response to being executed result in a computing device performing the method of any of Examples 47-52.

Example 70 includes a buyer device for transferring ownership of a compute device, the buyer device comprising means for determining to utilize an alternative rendezvous server for transfer of ownership of the compute device; means for receiving, from a current rendezvous server, an instruction to update a memory of the compute device to indicate the alternative rendezvous server is trusted; means for updating the memory of the compute device to indicate the alternative rendezvous server is a trusted device; and means for updating a block chain to identify the alternative rendezvous server and a subsequent buyer device of the compute device.

Example 71 includes the subject matter of Example 70, and wherein the means for determining to utilize the alternative rendezvous server comprises means for transmitting a message that identifies the alternative rendezvous server to the current rendezvous server.

Example 72 includes the subject matter of any of Examples 70 and 71, and wherein the means for transmitting the message that identifies the alternative rendezvous server to the current rendezvous server comprises means for cryptographically signing a public cryptographic key of the alternative rendezvous server with a private cryptographic key of the first buyer device to generate a signed message; and means for transmitting the signed message to the current rendezvous server.

Example 73 includes the subject matter of any of Examples 70-72, and wherein the means for receiving the instruction to update the memory comprises means for receiving an instruction to replace a hash of a public cryptographic key of the current rendezvous server with a hash of a public cryptographic key of the alternative rendezvous server in the memory of the compute device.

Example 74 includes the subject matter of any of Examples 70-73, and wherein the means for updating the block chain to identify the alternative rendezvous server and the subsequent buyer device comprises means for cryptographically signing a message with a private cryptographic key of the buyer device, wherein the message identifies a public cryptographic key of the subsequent buyer device and a public cryptographic key of the subsequent rendezvous device.

Example 75 includes the subject matter of any of Examples 70-74, and wherein the current rendezvous server and the alternative rendezvous server are separate instances of a block chain clearinghouse.

The invention claimed is:

1. A rendezvous server for automated device commissioning, the rendezvous server comprising:
   one or more processors coupled to memory, the one or more processors to host and facilitate:
   an ownership transfer circuitry to receive, from a buyer device, a request to transfer ownership of a compute device to the buyer device; and
   a verification circuitry to:
      verify provenance of the compute device based on a block chain, wherein the block chain identifies each transaction associated with ownership of the compute device;
      send an instruction to the compute device to perform an attestation to the rendezvous server using a private Enhanced Privacy Identification (EPID) key provisioned in a trusted execution environment (TEE) of the compute device by a manufacturer of the compute device;
      receive, in response to the instruction sent to the compute device to perform the attestation, an attestation quote from the compute device, wherein the attestation quote is generated with use of the private EPID key; and
      verify the attestation quote with use of a public EPID key corresponding to the private EPID key,
   wherein the ownership transfer circuitry is further to instruct the compute device to update its ownership to identify the buyer device as the owner, and
   wherein the ownership transfer circuitry is further to receive a message signed by the buyer device indicative of an alternative rendezvous server to be used to transfer ownership of the compute device to a second buyer device and update the block chain to identify the alternative rendezvous server.

2. The rendezvous server of claim 1, wherein to receive the request to transfer the ownership of the compute device comprises to receive a device token associated with a transfer of device ownership.

3. The rendezvous server of claim 1, wherein to verify the provenance of the compute device comprises to establish a sequence of transactions that resulted in a device token being delivered to the rendezvous server associated with the request to transfer the ownership of the compute device.

4. The rendezvous server of claim 1, wherein to verify the provenance of the compute device comprises to deny the request to transfer the ownership of the compute device in response to identification of on inconsistency in the block chain.

5. The rendezvous server of claim 1, wherein to instruct the compute device to update its ownership comprises to establish a secure session with the compute device in response to verification of the provenance.

6. The rendezvous server of claim 1, wherein the verification circuitry is further to verify that a public EPID key of the compute device is associated with a correct manufacturer based on the block chain.

7. The rendezvous server of claim 1, wherein the block chain includes a device commissioning record stored by the buyer device that identifies the rendezvous server.

8. The rendezvous server of claim 7, wherein the device commissioning record includes a hash of a public cryptographic key of the rendezvous server.

9. The rendezvous server of claim 1, wherein to verify provenance of the compute device based on the block chain comprises to inspect the block chain for a hash of a signature of the buyer device, wherein the presence of the hash of the signature of the buyer device indicates an intention of the buyer to use the rendezvous server.

10. The rendezvous server of claim 1, wherein the ownership transfer circuitry is further to register a commissioning device of a buyer with a DNS-Based Authentication of Named Entities (DANE) service.

11. The rendezvous server of claim 1, wherein the transfer circuitry is further to instruct the compute device to update an ownership record of the compute device to identify a buyer of the compute device.

12. A method for device commissioning by a rendezvous server, the method comprising:
   receiving, by the rendezvous server and from a buyer device, a request to transfer ownership of a compute device to the buyer device;
   verifying, by the rendezvous server, provenance of the compute device based on a block chain, wherein the block chain identifies each transaction associated with ownership of the compute device;
   instructing, by the rendezvous server, the compute device to perform an attestation to the rendezvous server using a private Enhanced Privacy Identification (EPID) key provisioned in a trusted execution environment (TEE) of the compute device by a manufacturer of the compute device;
   receiving, by the rendezvous server and in response to instructing the compute device to perform the attestation, an attestation quote from the compute device, wherein the attestation quote is generated with use of the private EPID key; and
   verifying, by the rendezvous server, the attestation quote with use of a public EPID key corresponding to the private EPID key; and
   instructing, by the rendezvous server, the compute device to update its ownership to identify the buyer device as the owner,
   wherein the transferring of ownership further includes receiving a message signed by the buyer device indicative of an alternative rendezvous server to be used to transfer ownership of the compute device to a second buyer device and updating the block chain to identify the alternative rendezvous server.

13. The method of claim 12, wherein verifying the provenance of the compute device comprises establishing a sequence of transactions that resulted in a device token being delivered to the rendezvous server associated with the request to transfer the ownership of the compute device.

14. The method of claim 12, wherein verifying the provenance of the compute device comprises denying the request to transfer the ownership of the compute device in response to identification of on inconsistency in the block chain.

15. The method of claim 12, wherein instructing the compute device to update its ownership comprises establishing a secure session with the compute device in response to verification of the provenance.

16. The method of claim 12, further comprising verifying that a public EPID key of the compute device is associated with a correct manufacturer based on the block chain.

17. One or more non-transitory machine-readable storage media comprising a plurality of instructions stored thereon that, when executed, cause a computing device to:
receive, from a buyer device, a request to transfer ownership of a compute device to the buyer device;
verify provenance of the compute device based on a block chain, wherein the block chain identifies each transaction associated with ownership of the compute device;
send an instruction to the compute device to perform an attestation to the rendezvous server using a private Enhanced Privacy Identification (EPID) key provisioned in a trusted execution environment (TEE) of the compute device by a manufacturer of the compute device;
receive, in response to the instruction sent to the compute device to perform the attestation, an attestation quote from the compute device, wherein the attestation quote is generated with use of the private EPID key; and
verify the attestation quote with use of a public EPID key corresponding to the private EPID key; and
instruct the compute device to update its ownership to identify the buyer device as the owner,
wherein the transferring of ownership further includes receiving a message signed by the buyer device indicative of an alternative rendezvous server to be used to transfer ownership of the compute device to a second buyer device and updating the block chain to identify the alternative rendezvous server.

18. The one or more non-transitory machine-readable storage media of claim 17, wherein to verify the provenance of the compute device comprises to establish a sequence of transactions that resulted in a device token being delivered to the rendezvous server associated with the request to transfer the ownership of the compute device.

19. The one or more non-transitory machine-readable storage media of claim 17, wherein to verify the provenance of the compute device comprises to deny the request to transfer the ownership of the compute device in response to identification of on inconsistency in the block chain.

20. The one or more non-transitory machine-readable storage media of claim 17, wherein to instruct the compute device to update its ownership comprises to establish a secure session with the compute device in response to verification of the provenance.

21. The one or more non-transitory machine-readable storage media of claim 17 wherein the plurality of instruction further cause the compute device to verify that a public EPID key of the compute device is associated with a correct manufacturer based on the block chain.

22. The one or more non-transitory machine-readable storage media of claim 21, wherein the block chain includes a device commissioning record stored by the buyer device that identifies the rendezvous server.

23. The one or more non-transitory machine-readable storage media of claim 22, wherein the device commissioning record includes a hash of a public cryptographic key of the rendezvous server.

* * * * *